(12) United States Patent
Keal

(10) Patent No.: US 10,958,838 B2
(45) Date of Patent: *Mar. 23, 2021

(54) METHOD AND DEVICE FOR ELECTRONIC IMAGE STABILIZATION OF A CAPTURED IMAGE

(71) Applicant: InvenSense, Inc., San Jose, CA (US)

(72) Inventor: William Kerry Keal, Santa Clara, CA (US)

(73) Assignee: InvenSense, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/679,046

(22) Filed: Nov. 8, 2019

(65) Prior Publication Data

US 2020/0186715 A1 Jun. 11, 2020

Related U.S. Application Data

(63) Continuation of application No. 15/418,488, filed on Jan. 27, 2017, now Pat. No. 10,477,107.

(51) Int. Cl.
*H04N 5/228* (2006.01)
*H04N 5/232* (2006.01)

(52) U.S. Cl.
CPC ..... *H04N 5/23258* (2013.01); *H04N 5/23267* (2013.01)

(58) Field of Classification Search
CPC .......... H04N 5/23258; H04N 5/23229; H04N 5/23287

USPC .................................................... 348/208.5
See application file for complete search history.

(56) References Cited

U.S. PATENT DOCUMENTS

| 7,104,129 | B2 | 9/2006 | Nasiri et al. | |
|---|---|---|---|---|
| 8,054,335 | B2 | 11/2011 | Deng et al. | |
| 8,913,140 | B2 | 12/2014 | Zhou | |
| 8,952,832 | B2 | 2/2015 | Nasiri et al. | |
| 2004/0238718 | A1* | 12/2004 | Washisu | G02B 27/646 250/201.2 |
| 2012/0049061 | A1* | 3/2012 | Luecken | H01J 37/222 250/307 |
| 2013/0002933 | A1* | 1/2013 | Topliss | G03B 3/10 348/345 |
| 2015/0319365 | A1* | 11/2015 | Lloyd | H04N 5/23258 348/208.11 |

* cited by examiner

*Primary Examiner* — Usman A Khan

(57) ABSTRACT

In a method of electronic image stabilization, a processor buffers image data into a memory buffer, the image data being obtained by the processor from an image sensor disposed in an electronic device. The processor obtains motion data from a motion sensor disposed in the electronic device, wherein the motion data corresponds with a time of capture of the image data. The processor analyzes the motion data to determine a stabilization correction to apply to the image data. The processor applies the determined stabilization correction to the image data to achieve stabilized image data. The determined stabilization correction is applied, and the stabilized image data is achieved, by the processor without requiring a transfer of the image data from the memory buffer to a graphics processing unit. The stabilized image data is output.

20 Claims, 11 Drawing Sheets

900

```
┌─────────────────────────────────────────────────────────────┐
│ BUFFERING, BY A PROCESSOR INTO A MEMORY BUFFER, IMAGE DATA  │
│ OBTAINED BY THE PROCESSOR FROM AN IMAGE SENSOR DISPOSED IN AN│
│                     ELECTRONIC DEVICE                        │
│                           910                                │
└─────────────────────────────────────────────────────────────┘
                              │
                              ▼
┌─────────────────────────────────────────────────────────────┐
│ OBTAINING, BY THE PROCESSOR, MOTION DATA FROM A MOTION SENSOR│
│ DISPOSED IN THE ELECTRONIC DEVICE, WHEREIN THE MOTION DATA  │
│ CORRESPONDS WITH A TIME OF CAPTURE OF THE IMAGE DATA        │
│                           920                                │
└─────────────────────────────────────────────────────────────┘
                              │
                              ▼
┌─────────────────────────────────────────────────────────────┐
│   ANALYZING, BY THE PROCESSOR, THE MOTION DATA TO DETERMINE A│
│      STABILIZATION CORRECTION TO APPLY TO THE IMAGE DATA    │
│                           930                                │
└─────────────────────────────────────────────────────────────┘
                              │
                              ▼
┌─────────────────────────────────────────────────────────────┐
│   APPLYING, BY THE PROCESSOR, THE DETERMINED STABILIZATION  │
│  CORRECTION TO THE IMAGE DATA TO ACHIEVE STABILIZED IMAGE DATA,│
│  WHEREIN THE DETERMINED STABILIZATION CORRECTION IS APPLIED AND│
│  THE STABILIZED IMAGE DATA IS ACHIEVED BY THE PROCESSOR WITHOUT│
│   REQUIRING A TRANSFER OF THE IMAGE DATA FROM THE MEMORY BUFFER│
│              TO A GRAPHICS PROCESSING UNIT                  │
│                           940                                │
└─────────────────────────────────────────────────────────────┘
                              │
                              ▼
┌─────────────────────────────────────────────────────────────┐
│              OUTPUTTING THE STABILIZED IMAGE DATA           │
│                           950                                │
└─────────────────────────────────────────────────────────────┘
```

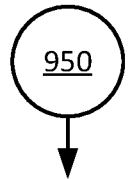

```
┌─────────────────────────────────────────────────────────────────────┐
│  CONTROLLING, BY THE PROCESSOR, ONE OR MORE OF A DATA RATE AND A FULL │
│              SCALE RANGE OF THE MOTION SENSOR                         │
│                            960                                        │
└─────────────────────────────────────────────────────────────────────┘
```

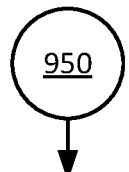

```
┌─────────────────────────────────────────────────────────────────────┐
│  CONTROLLING, BY THE PROCESSOR, AN OPTICAL IMAGE STABILIZATION SYSTEM OF │
│         THE IMAGE SENSOR BASED ON THE MOTION DATA                     │
│                            970                                        │
└─────────────────────────────────────────────────────────────────────┘
```

FIG. 9C

METHOD AND DEVICE FOR ELECTRONIC IMAGE STABILIZATION OF A CAPTURED IMAGE

RELATED APPLICATIONS

This application claims priority to and the benefit of co-pending U.S. patent application Ser. No. 15/418,488, filed on Jan. 27, 2017, entitled "ELECTRONIC IMAGE STABILIZATION OF A CAPTURED IMAGE," by William Kerry Keal, and assigned to the assignee of the present application, which is incorporated herein by reference in its entirety.

BACKGROUND

Advances in technology have enabled the introduction of electronic devices that feature an ever increasing set of capabilities. Smartphones, for example, now offer sophisticated computing and sensing resources together with expanded communication capability, digital imaging capability, and user experience capability. Likewise, tablets, wearables, media players, Internet connected devices (which may or may not be mobile), and other similar electronic devices have shared in this progress and often offer some or all of these capabilities. Many of the capabilities of electronic devices, and in particular mobile electronic devices, are enabled by sensors (e.g., accelerometers, gyroscopes, pressure sensors, thermometers, acoustic sensors, etc.) that are included in the electronic device. That is, one or more aspects of the capabilities offered by electronic devices will rely upon information provided by one or more of the sensors of the electronic device in order to provide or enhance the capability. In general, sensors detect or measure physical or environmental properties of the device or its surroundings, such as one or more of the orientation, velocity, and acceleration of the device, and/or one or more of the temperature, acoustic environment, atmospheric pressure, etc. of the device and/or its surroundings, among others. Based on measurements of motion, for example, electronic image stabilization may be performed on image data of a captured image.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 9A-9C illustrate flow diagrams of an example method of electronic image stabilization, in accordance with various aspects of the present disclosure.

DESCRIPTION OF EMBODIMENTS

Figure 1:
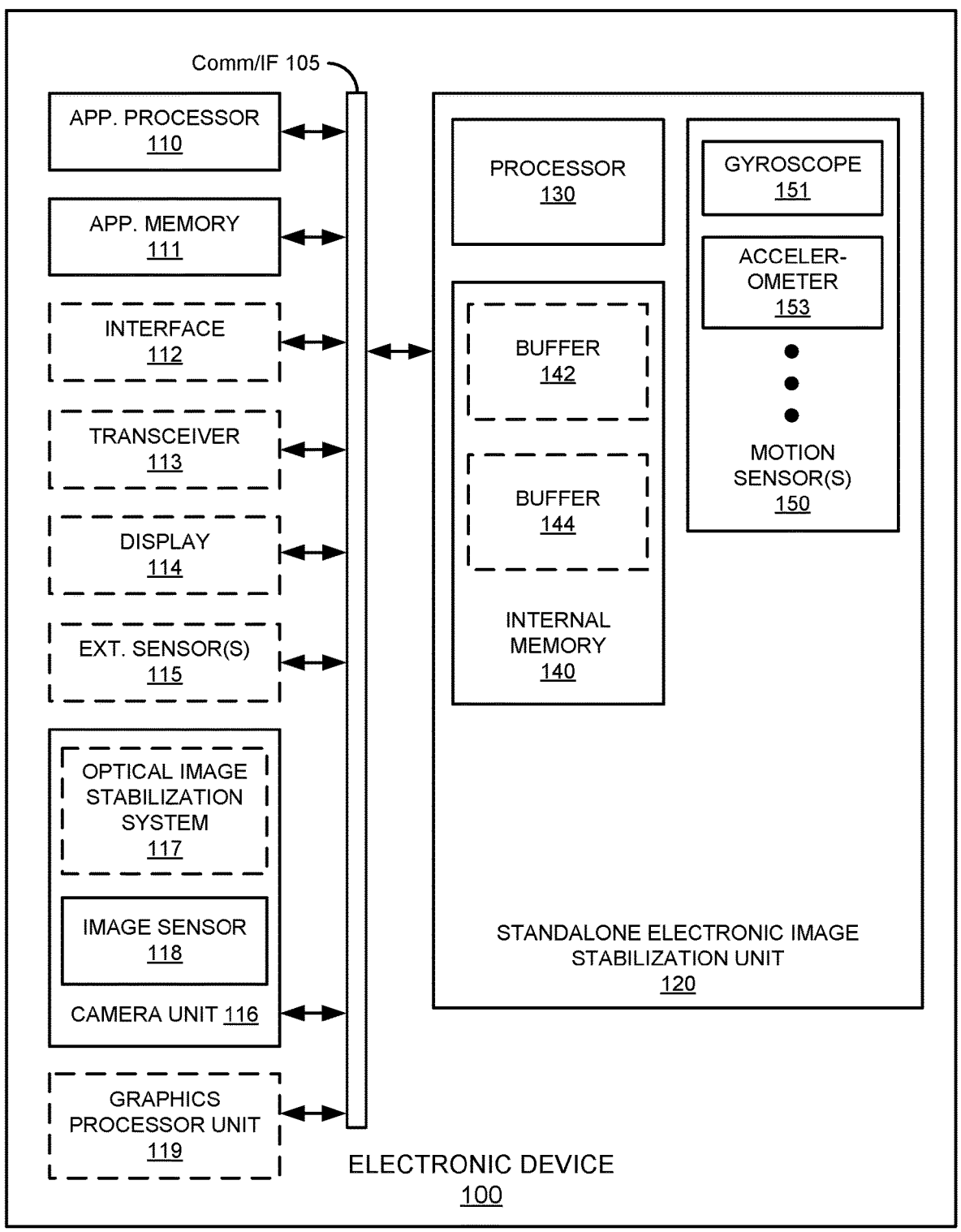
FIG. 1 shows a block diagram of an example electronic device comprising a standalone electronic image stabilization (S-EIS) unit, in accordance with various aspects of the present disclosure.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

Electronic image stabilization (EIS) is traditionally performed by a graphics processing unit (GPU), which includes one or more processor designed and optimized for image processing operations. Various aspects of this disclosure comprise a system, device, unit, and/or method for performing electronic image stabilization of the image data captured by an image sensor, without using a GPU. By electronic image stabilization what is meant is that artifacts of motion are reduced or removed from the captured image data to produce stabilized image data. Motion refers to any change in positon and/or orientation. As described herein, these artifacts may be removed or reduced by comparing the captured image data with motion data that has been captured in synchronization with the image data, and then adjusting the image data to compensate for the relative motion/orientation indicated by the motion data. As part of the electronic image stabilization the image data may be cropped (i.e., only a subset selected and the rest discarded), filtered (such as by averaging or weighting two or more pixels or regions together to achieve a filtered region), transformed (such as geometrical transformations to correct for changes in perspective due to motion), and/or resized (a pixel or region in the image data may be remapped or stretched to take up more or less room in the stabilized image data). As will be discussed herein, all of this electronic image stabilization is performed in a standalone fashion. By standalone, what is meant is that the electronic image stabilization is all performed in situ by a processor and memory of a standalone electronic image stabilization (S-EIS) unit. This reduces the number of times that captured image data is transferred within an electronic device and speeds the stabilization. This improves efficiency by eliminating the time consumed by such data transfer (such as back and forth between a processor a GPU and a memory) and by offloading such tasks from a GPU of an electronic device (if included) and from the application processor of an electronic device if a GPU is not included in the electronic device. Reducing the amount of data transfer also reduces the potential for timing problems, generation of errors, and/or loss of data. Moreover, a system with a standalone EIS unit but without a GPU is easier to design. In some embodiments of the invention described herein it is not required to transfer and store complete image frames in the standalone EIS unit, which thus requires less memory and reduces cost versus including a memory that can store a complete image frame.

Discussion begins with a description of notation and nomenclature. Discussion continues with description of an example electronic device that includes an image sensor and a S-EIS unit (with which or upon which various embodiments described herein may be implemented.). Several examples are then described which explain and illustrate the electronic transformation of the image data into stabilized image data. Finally, operation of the S-EIS unit and components thereof are then further described in conjunction with description of an example method of electronic image stabilization.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "buffering," "obtaining," "analyzing," "applying," "outputting," "controlling," "reading," "selectively reading," "writing," "storing," "outputting," "adapting a memory size," "transforming," "cropping," "resizing," "filtering," "delaying," or the like, refer to the actions and processes of an electronic device or component such as: a standalone electronic image stabilization (S-EIS) unit, a processor of an S-EIS unit, a processor, a memory/buffer, or the like, or a combination thereof. The electronic device/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, cause a processor and/or other components to perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more standalone electronic image stabilization (S-EIS) unit, host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein, but does not refer to a graphics processing unit (GPU). In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an S-EIS unit and a microprocessor, a plurality of microprocessors, one or more microprocessors in conjunction with an S-EIS unit core, or any other such configuration.

In various example embodiments discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS circuits. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

In the described embodiments, an electronic device incorporating a sensor may, for example, employ an electronic image stabilization module also referred to as a standalone electronic image stabilization (S-EIS) unit that includes at least one sensor in addition to electronic circuits. The at least one sensor may comprise any of a variety of sensors, such as for example a gyroscope, a magnetometer, an accelerometer, a microphone, a pressure sensor, a proximity sensor, a moisture sensor, a temperature sensor, a biometric sensor, or an ambient light sensor, among others known in the art.

Some embodiments may, for example, comprise one or more motion sensors. For example, an embodiment with an accelerometer, a gyroscope, and a magnetometer or other compass technology, which each provide a measurement along three axes that are orthogonal relative to each other, may be referred to as a 9-axis device. Other embodiments may, for example, comprise an accelerometer, gyroscope, compass, and pressure sensor, and may be referred to as a 10-axis device. Other embodiments may not include all the sensors or may provide measurements along one or more axes.

The sensors may, for example, be formed on a first substrate. Various embodiments may, for example, include solid-state sensors and/or any other type of sensors. The electronic circuits in the S-EIS unit may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package, such as a single integrated circuit.

In an example embodiment, the first substrate is attached to the second substrate through wafer bonding, as described in commonly owned U.S. Pat. No. 7,104,129, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

Example Electronic Device

Turning first to FIG. 1, such figure shows a block diagram of an example electronic device 100 comprising a standalone electronic image stabilization (S-EIS) unit 120, in accordance with various aspects of the present disclosure. As will be appreciated, the device 100 may be implemented as a mobile electronic device or apparatus. By mobile, what is meant is that the electronic device is a handheld and/or wearable device (e.g., a watch, a headband, a pendant, an armband, a belt-mounted device, eyeglasses, a fitness device, a health monitoring device, etc.) that can be held in the hand of a user and/or worn on the person of the user and when moved in space by a user its motion and/or orientation in space are therefore sensed. For example, such a handheld device may without limitation be a mobile phone (e.g., a cellular phone, a phone running on a local network, or any other telephone handset), wired telephone (e.g., a phone attached by a wire and/or optical tether), personal digital assistant (PDA), pedometer, personal activity and/or health monitoring device, video game player, video game controller, navigation device, mobile internet device (MID), personal navigation device (PND), digital still camera, digital video camera, a tablet computer, a head mounted display (HMD), a virtual reality of augmented reality display, a notebook computer, binoculars, telephoto lens, portable music, video, or media player, remote control, or other handheld device, a wristwatch, a mobile internet of things (IOT) device, or a combination of one or more of these devices.

In some embodiments, the device 100 may be a self-contained device that comprises its own display and/or other output devices in addition to input devices as described below. However, in other embodiments, the device 100 may function in conjunction with another portable device or a non-portable device such as a desktop computer, electronic tabletop device, server computer, etc., which can communicate with the device 100, e.g., via network connections. The device 100 may, for example, be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

As shown, the example device 100 comprises a communication interface 105, an application (or host) processor 110, application (or host) memory 111, a camera unit 116 with an image sensor 118, and a standalone electronic image stabilization (S-EIS) unit 120 with at least one motion sensor 150 such as a gyroscope 151. With respect to FIG. 1, components showed in broken line (i.e., dashed boxes) may not be included in some embodiments. Accordingly, in some embodiments, device 100 may include one or some combination of: interface 112, transceiver 113, display 114, external sensor(s) 115, an optical image stabilization system 117 (disposed internal or external to camera unit 116), and a graphics processing unit 119. As depicted in FIG. 1, included components are communicatively coupled with one another, such as, via communication interface 105.

The application processor 110 (also referred to herein as "host processor" 110) may, for example, be configured to perform the various computations and operations involved with the general function of the device 100 (e.g., running applications, performing operating system functions, performing power management functionality, controlling user interface functionality for the device 100, etc.). Application processor 110 can be one or more microprocessors, central processing units (CPUs), DSPs, general purpose microprocessors, ASICs, ASIPs, FPGAs or other processors which run software programs or applications, which may be stored in application memory 111, associated with the functions and capabilities of mobile electronic device 100. The application processor 110 may, for example, be coupled to S-EIS unit 120 through a communication interface 105, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent.

The application memory 111 (for example, a host memory) may comprise programs, drivers or other data that utilize information provided by the S-EIS unit 120. Details regarding example suitable configurations of the application (or host) processor 110 and S-EIS unit 120 may be found in co-pending, commonly owned U.S. patent application Ser. No. 12/106,921, filed Apr. 21, 2008. Application memory 111 can be any suitable type of memory, including but not limited to electronic memory (e.g., read only memory (ROM), random access memory, or other electronic memory), hard disk, optical disk, or some combination thereof. Multiple layers of software can be stored in application memory 111 for use with/operation upon application processor 110. In some embodiments, a portion of application memory 111 may be utilized as a buffer for data from one or more of the components of device 100.

Interface 112, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 113, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Display 114, when included, may be a liquid crystal device, (organic) light emitting diode device, or other display device suitable for creating and visibly depicting graphic images and/or alphanumeric characters recognizable to a user. Display 114 may be configured to output images viewable by the user and may additionally or alternatively function as a viewfinder for camera unit 116.

External sensor(s) 115, when included, may comprise, without limitation, one or more or some combination of: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an image sensor, an inertial or motion sensor (e.g., a gyroscope, accelerometer, or magnetometer) for measuring the orientation or motion of the sensor in space, a proximity sensor, an ambient light sensor, a biometric sensor, and a moisture sensors, or other type of sensor for measuring other physical or environmental quantities. External sensor 115 is depicted as being coupled with communication interface 105 for communication with application processor 110, application memory 111, and/or other components, this coupling may be by any suitable wired or wireless means. It should be appreciated that, as used herein, the term "external sensor" generally refers to a sensor that is carried on-board device 100, but that is not integrated into (i.e., internal to) the S-EIS unit 120.

Camera unit 116, when included, typically includes an optical element, such as a lens which projects an image onto an image sensor 118 of camera unit 116.

In some embodiments camera unit 116 may include an Optical Image Stabilization (OIS) system 117. In optical image stabilization, the optical element may be moved with respect to the image sensor 118 in order to compensate for motion of the mobile electronic device. OIS systems such as OIS 117 typically include/utilize processing to determine compensatory motion of the optical element of camera unit 116 in response to sensed motion of the mobile electronic device 100 or portion thereof, such as the camera unit 116 itself. Actuators within camera unit 116 operate to provide the compensatory motion in the image sensor 118, lens, or both, and position sensors may be used to determine whether the actuators have produced the desired movement. In one aspect, an actuator may be implemented using voice coil motors (VCM) and a position sensor may be implemented with Hall sensors, although other suitable alternatives may be employed. Camera unit 116 may have its own dedicated motion sensors to determine the motion, may receive motion data from a motion sensor external to camera unit 116 (e.g., in S-EIS unit 120), or both. The OIS controller may be incorporated in camera unit 116, or may be external to camera unit 116. For example, processor 130 may analyze the motion detected by gyroscope 151 and send control signals to the optical image stabilization system 117.

Mobile electronic device 100 may have both an OIS system 117 (as part of camera unit 116) and an electronic image stabilization system such as S-EIS unit 120, which each may work separately under different conditions or demands, or both systems may work in combination. For example, OIS 117 may perform a first stabilization, and S-EIS unit 120 may perform a subsequent second stabilization, in order to correct for motion that the OIS system 117 was not able to compensate. The S-EIS unit 120 may be a motion sensor-assisted S-EIS unit. In the case of a motion sensor-assisted S-EIS unit, the S-EIS unit 120 and OIS system 117 may use dedicated motion sensors, or may use the same motion sensor(s) (e.g., gyroscope 151 and/or accelerometer 153).

Image sensor 118 is a sensor that electrically detects and conveys the information that constitutes an image. The detection is performed by converting light waves that reach the image sensor into electrical signals representative of the image information that the light waves contain. Any suitable sensor may be utilized as image sensor 118, including, but not limited to a charge coupled device or a metal oxide semi-conductor device. Camera unit 116 may comprise an image processor (not depicted) which may be used for control of the image sensor and any type of local image processing. The image processor may also control communication such as sending and/or receiving information, e.g., sync signals, control signals/instructions, messages, counters, image data, and the like. Camera unit 116 or a portion thereof, such as image sensor 118, is coupled with application processor 110, S-EIS unit 120, and GPU 119 (when included) by communication interface 105, or other well-known communication means.

Graphics processing unit (GPU) 119, when included, is a processor optimized for processing images and graphics and typically includes hundreds of processing cores that are configured for handling, typically, thousands of similar threads simultaneously via parallel processing. For purposes of this disclosure, a processor is not considered a GPU just because it processes image data. In contrast to a GPU, application processor 110 is typically a general-purpose processor which includes only one or at the most several processing cores. Likewise, in contrast to a GPU, processor 130 typically includes only one or at the most several processing cores, and does not fit the definition of a GPU in either its structure or its mechanisms for special purpose parallel data processing.

Electronic device 100 may include a Standalone Electronic Image Stabilization (S-EIS) unit 120. In S-EIS unit 120, the image stabilization is performed using one or more stabilization correction techniques, a variety of which are described herein. For example, during image capture, the motion of electronic device 100 and/or image sensor 118 may result in portions of the image data within a frame of image data being displaced relative to other portions of the image data within frame and/or displaced in whole due to the angle of tilt of image sensor 118 relative to a horizontal plane or horizon that is perpendicular to gravity. The S-EIS unit 120 analyzes these displacements (as measured by motion sensors such as gyroscope 151 and/or accelerometer 153) using image processing techniques, and corrects for this motion by transforming the image data of a frame so that it aligns and is motion stabilized. The displacement vectors may also be determined using one or more motion sensors 150. For example, gyroscope data, in the form of angular velocities measured by gyroscope 151 are used to help determine the displacement vector from one image section to the next image section, for example from one line to the next line, or from one frame to the next frame. Similarly, a gravity vector may be determined by a gyroscope 151 and/or accelerometer 153 to determine the roll displacement of the image frame on the optical axis. The required image processing may be performed by processor 130, host processor 110, or any other processor of electronic device 100 that is not a specialized graphical processor (i.e., the EIS processing described herein is not performed by a GPU such as GPU 119).

By performing the electronic image stabilization without the use of a GPU, image data communication is reduced which reduces delays in output of stabilized image data. Additionally, the stabilization corrections can be performed on the fly by the S-EIS unit 120 without the need to wait for all of the image data for a frame to be stored in a buffer, this can reduce the memory needed for buffering and thus reduce the overall memory requirements for an electronic device. Although depicted separately, in some embodiments, S-EIS unit 120 may be integrated, locally, as a portion of camera unit 116. Such locality improves throughput speed of electronic image stabilization and may eliminate at least one round of image data transfer requirements by utilizing a buffer of S-EIS unit 120 as the direct buffer for image data output by image sensor 118. Another advantage of increased speed is that the stabilized image may be directly displayed on a screen visible to the user, something that may not be done in systems with a higher latency on the displayed image because it will cause the image to lag compared to the real world (which decreases the quality of the user experience).

In this example embodiment, the S-EIS unit 120 is shown to comprise a processor 130, internal memory 140 and one or more motion sensors 150. In some embodiments motion sensors 150 are internal sensors to S-EIS unit 120, and S-EIS unit may include additional internal sensors that are not motion sensors. In various embodiments, S-EIS unit 120 or a portion thereof, such as processor 130, is communicatively coupled with application processor 110, application memory 111 and image sensor 118 of camera unit 116 through communications interface 105 or other well-known means. S-EIS unit 120 may also comprise a communications interface similar to communications interface 105 for communication of the component within the unit (not shown).

Processor 130 can be one or more microprocessors, CPUs, DSPs, general purpose microprocessors, ASICs, ASIPs, FPGAs or other processors which run software programs, which may be stored in memory internal memory 140 (or elsewhere), associated with the functions of standalone electronic image stabilization (S-EIS) unit 120. Processor 130 is not a graphical processing unit (GPU). Processor 130 operates to perform the transformations, reading, writing, and remapping involved in the stabilization corrections described herein. Processor 130 also operates to control and configure motion sensor(s) 150, such as e.g., setting the output data rate and full scale data rate, such that the motion data may be utilized for optical image stabilization, electronic image stabilization, and/or other purposes. In some embodiments, processor 130 may control the operations of optical image stabilization system 117 to operate separately from or in concert with electronic image stabilization performed by S-EIS unit 120. Large electronic image stabilizations can be performed on image data that was captured while optical image stabilization was being performed in camera unit 116. For example, based on motion data from motion sensors 150, processor 130 may control OIS system 117 to compensate for small changes in motion, as the small changes occur, that would be difficult or impossible to stabilize well with electronic image stabilization alone.

Internal memory 140 may store algorithms, routines or other instructions for instructing processor 130 on the processing of data output by one or more of the motion sensors 150. Memory 140 is coupled with processor 130 such as by a bus or other well-known means. In some embodiments, one or more portions of internal memory 140 may be utilized as a buffer (e.g., buffer 142) for image data received from image sensor 118 and another portion of memory 140 may be used as a second buffer (e.g., buffer 144) for stabilized image data that is created after processor 130 processes image data stored in buffer 142. In some embodiments, as illustrated, buffers 142 and 144 may be separate portions of the same memory (e.g., internal memory 140). In other embodiments, buffers 142 and 144 may be implemented in separate memories from one another, and one or more of these separate memories may be external to S-EIS unit 120. In some embodiments, the size of buffer 142, buffer 144, or both is adapted by processor 130. For example, a portion of memory used to buffer image data can be adapted based on the size of the image data (i.e., the number of bytes of data that are required to be buffered). For example, the size of buffer 142 may be adapted by processor 130 to hold and buffer all of the image data of a frame in an embodiment where a full frame of image data is required to be buffered. However, if only a sub-portion (less than a full image frame) of image data is required to be buffered to perform stabilization, then processor 130 can adapt the size of buffer 142 to be just large enough to store the image data of this sub-portion of an image frame. Likewise, if a crop percentage to be used in image stabilization is known, then the first buffer 142 may be adaptively sized by processor 130 so that it only holds enough image data to support that crop percentage. Similarly, processor 130 may adapt the size of buffer 144 based on the amount of data in the cropped or cropped and resized stabilized image data that will be stored in buffer 144 before being output from buffer 144. The size of the buffers may also be adapted based on the available power and/or computing resources. For example, in a low-power mode, the buffer size may be smaller so that it requires less power. In one aspect, the buffer size may also be designed to be less than a full image frame to save costs and provide image stabilization at as low as possible a cost in terms of economy of memory. For example, depending on the application, the S-EIS may be designed only to perform cropping with a certain maximum cropping percentage that is less than 100% of the full image frame, and as such the size of the buffer is adapted according to these stabilization specifications and the desired maximum cropping percentage to hold only the amount of image data required to obtain the designed maximum cropping percentage.

As used herein, the term "internal sensor" generally refers to a sensor implemented, for example using MEMS techniques, for integration with the S-EIS unit 120 into a single chip, such as a single integrated circuit. Internal sensor(s) may, for example and without limitation, comprise one or more or some combination of: gyroscope 151 and accelerometer 153. Though not shown, the motion sensors 150 may additionally or alternatively include a magnetometer implemented as an internal sensor to S-EIS unit 120. One or more other internal sensors, such as: a temperature sensor, a light sensor, a moisture sensor, a biometric sensor, an acoustic sensor, a barometric sensor, etc. may additionally be implemented as an internal sensor of S-EIS unit 120.

The motion sensors 150 may, for example, be implemented as MEMS-based motion sensors, including inertial sensors such as a gyroscope or accelerometer, or an electromagnetic sensor such as a Hall effect or Lorentz field magnetometer. In some embodiments, at least a portion of the internal sensors 150 may also, for example, be based on sensor technology other than MEMS technology (e.g., CMOS technology, etc.). As desired, one or more of the motion sensors 150 may be configured to provide raw data output measured along three orthogonal axes or any equivalent structure. Motion sensor(s) 150 are communicatively coupled with processor 130 by a communication interface, bus, or other well-known communication means.

Even though various embodiments may be described herein in the context of internal sensors implemented in the S-EIS unit 120, these techniques may be applied utilizing one or more non-integrated sensors, such as external sensor 115 (which may be a motion sensor).

As will be appreciated, the application (or host) processor 110 and/or processor 130 may be one or more microprocessors, central processing units (CPUs), microcontrollers or other processors which run software programs for electronic device 100 and/or for other applications related to the functionality of the device 100. For example, different software application programs such as menu navigation software, games, camera function control, navigation software, and phone or a wide variety of other software and functional interfaces can be provided. In some embodiments, multiple different applications can be provided on a single device 100, and in some of those embodiments, multiple applications can run simultaneously on the device 100. Multiple layers of software can, for example, be provided on a computer readable medium such as electronic memory or other storage medium such as hard disk, optical disk, flash drive, etc., for use with application processor 110 and processor 130. For example, an operating system layer can be provided for the device 100 to control and manage system resources in real time, enable functions of application software and other layers, and interface application programs with other software and functions of the device 100. In various example embodiments, one or more motion algorithm layers may provide motion algorithms for lower-level processing of raw sensor data provided from internal or external sensors. Further, a sensor device driver layer may provide a software interface to the hardware sensors of the device 100. Some or all of these layers can be provided in the application memory 111 for access by the application processor 110, in internal memory 140 for access by the processor 130, or in any other suitable architecture (e.g., including distributed architectures).

As discussed herein, various aspects of this disclosure may, for example, comprise processing various sensor signals indicative of device motion and/or orientation. These signals are generally referred to as "motion data" herein. Non-limiting examples of such motion data are signals that indicate accelerometer, gyroscope, and/or magnetometer data in a coordinate system. The motion data may refer the processed or non-processed data from the motion sensor(s).

In an example implementation, data from an accelerometer, gyroscope, and/or magnetometer may be combined in a so-called data fusion process, performed, for example, by processor 130, in order to output motion data in the form of a vector indicative of device orientation and/or indicative of a direction of device motion. Such a vector may, for example, initially be expressed in a body (or device) coordinate system. Such a vector may be processed by a transformation function that transforms the orientation vector to a world coordinate system. The motion and/or orientation data may be represented in any suitable reference frame most adapted for the image stabilization, and may be represented in any suitable form, such as for example, but not limited to, quaternions, orientation matrices, or Euler angles.

The discussion of FIGS. 2 through 8 will provide further example details of at least the operation of the electronic image stabilization described herein with respect to S-EIS unit 120. It should be understood that any or all of the functional modules discussed herein may be implemented in a pure hardware implementation and/or by one or more processors operating in accordance with software instructions. It should also be understood that any or all software instructions may be stored in a non-transitory computer-readable medium.

Figure 2:
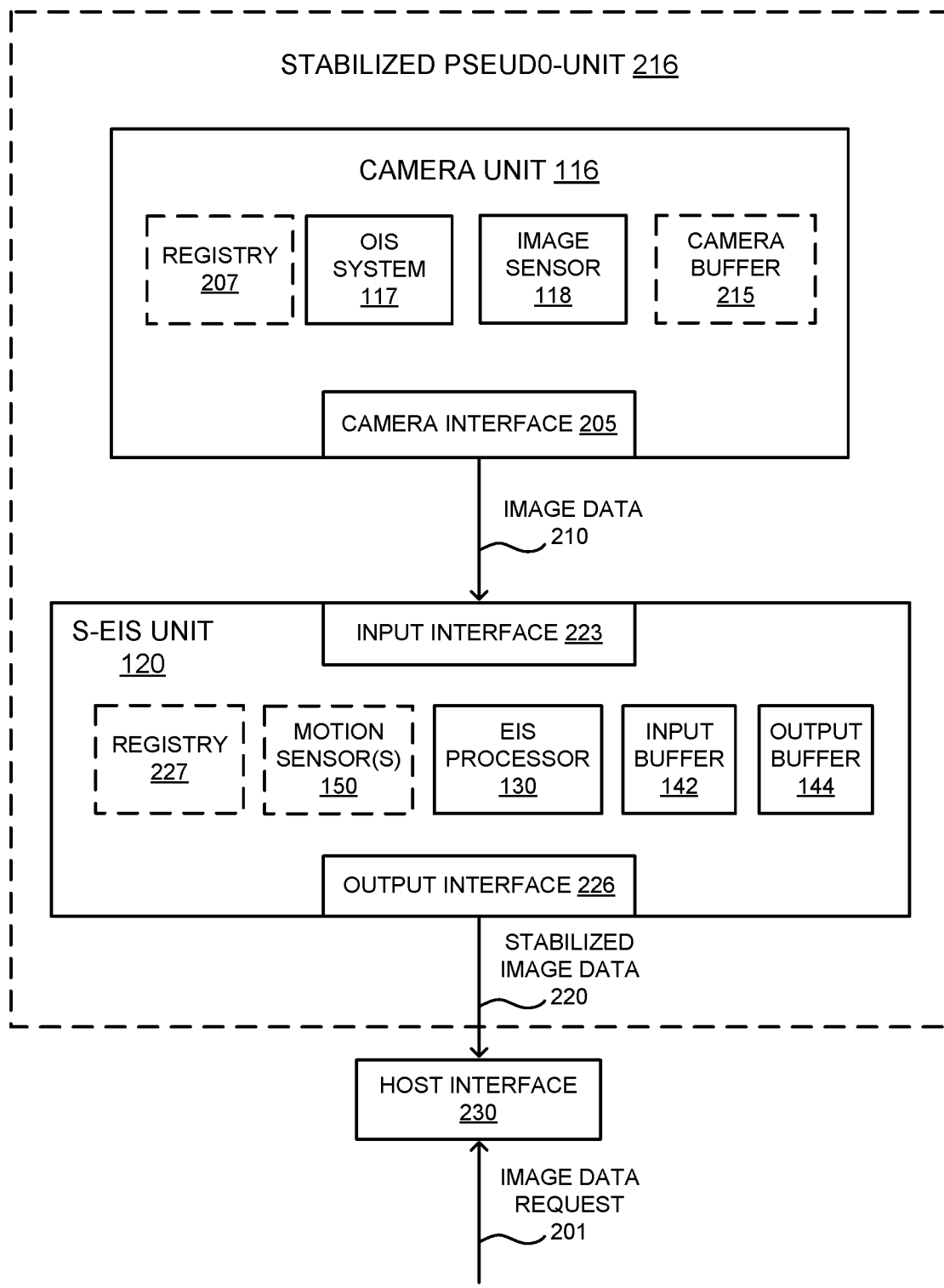
FIG. 2 illustrates an example of the flow of data during image stabilization performed with a S-EIS unit, in accordance with various aspects of the present disclosure.

FIG. 2 illustrates an example of the flow of data during image stabilization performed with a standalone electronic image stabilization (S-EIS) unit 120, in accordance with various aspects of the present disclosure. When an image data request 201 is made for image data 210, the camera unit 116 with image sensor 118 outputs the image data 210. The image data request will go through the operating system and may come from any program or application executed, for example, by application processor 110. The image data 210 may be output, for example, line by line, or section by section, or as fast as the image sensor 118 can capture and output the image data 210. This mode will further be referred to as a continuous output mode, and the details may depend on the type of image sensor and/or the configuration of the image sensor. Outputting may also mean that the camera unit 116 puts the image data 210 in an internal camera buffer 215 of camera unit 116, for an external processor to read the image data 210. The mode will further be referred to as a buffered output mode. The image data 210 output by the camera unit 116 is raw, or non-stabilized. The S-EIS unit 120 may be associated or connected with the camera unit 116 in such a way that for the component performing the image data request 201, no change has taken place. In other words, the S-EIS unit 120 receives or takes the non-stabilized image data 210 from the camera unit 116 and converts this into stabilized image data 220, but to the outside it will look as if the camera unit 116 itself has produced the stabilized data. In other words, to the operating system or component/application requesting image data 210, it appears that the stabilized image data 220 is coming directly from camera unit 116. In FIG. 2, this is indicated by the dashed box around the S-EIS unit 120 and the camera unit 116, marked as 'stabilized pseudo-unit' 216. The means the output of the S-EIS unit 120 mimics the output of the camera unit 116. If the camera unit 116 is outputting the image data 210 in a certain format, or with a certain output rate, the S-EIS unit 120 will output in the same format and with the same rate. If the processor that performs the request normally reads the data in the camera buffer 215, now the output buffer 144 of the S-EIS unit 120 mimics the camera buffer 215 so that the processor is reading from the output buffer 144 of the S-EIS unit 120.

The camera unit 116 may have a registry 207 associated with image sensor 118. registry 207 is a memory region in which the settings, command, and parameters for the operation of camera unit 116 are stored. This registry 207 may have a memory address or registry address. A host processor 110 may access the registry 207 through a host interface 230 connected to the camera interface 205 of the camera unit 116. In a similar manner, the camera buffer 215 (memory) may be accessed. The address of the registry 207 of the camera unit 116 may be known to the host processor 110 or the host interface 230. In one aspect, the registry address of registry 207 may be changed to the registry address for the registry 227 of S-EIS unit 120, so that the host interface 230 addresses the S-EIS unit 120 instead of the camera unit 116. For example, EIS processor 130 may make these changes in order that the host interface 230 addresses S-EIS unit 120 instead of camera unit 116. Registry 227, and its registry addresses, is associated with S-EIS unit 120 and components thereof. The processor in the S-EIS unit 120 may then transfer any required data to the registry 207 in the camera unit 116. This may be referred to as a bypass mode, where communication to camera unit 116 flows through S-EIS unit 120. Application processor 110 (or other portion of electronic device 100 that is external to S-EIS unit 120) writes any registry entries into registry 227, e.g., through host interface 230, and the S-EIS unit 120 then passes the required registry data through to camera unit 116 and writes the registry data in registry 207. The by-pass mode may be selectively turned on and off depending on the context, and as such activate the S-EIS unit 120 or not. In order words, the S-EIS unit 120 may be controlled by means of the registry addresses. In one aspect, the S-EIS unit 120 may perform the image stabilization when indicated through the use of the registry addressing, or may not perform any image stabilization but may still provide motion data from the sensors the other parts of the system which may perform image stabilization, such as an OIS 117 or another independent EIS. In another aspect, the registry address of the registry 227 of S-EIS unit 120 may be identical to the registry address of the registry 207 of the camera unit 116 so that the host interface 230 think it is interacting with camera unit 116. In this aspect, the host processor 110/host device does not need to be modified or made aware of the presence of the S-EIS unit 120. In some architectures, the mimicking of the registry address of the camera unit 116 by the S-EIS unit 120 lead to errors if both identical registry addresses are visible to the host. In these situations, the registry 207 of the camera unit 116 may be changed, blocked, or otherwise made unavailable (if the registry address of registry 207 is known to the host cannot be changed). In one aspect, the S-EIS unit 120 may write the stabilized image data 220 back into camera buffer 215, in which case output buffer 144 may not be needed. In such an embodiment, camera buffer 215, which is associated with image sensor 118 and located external to S-EIS unit 120 serves as an output buffer for the stabilized image data 220.

The host interface 230 interfaces with the output interface 226 of the S-EIS unit 120 instead of the camera interface 205, and the input interface 223 of the S-EIS unit 120 will interface with the camera interface 205. Any registry (setting) data or image data 210 will flow through these interfaces. The camera unit 116 may consist of a single package and may be mounted on a substrate. The S-EIS unit 120 may also consist of a single package and may also be mounted on the same substrate. The camera interface 205 may be directly connected to the input interface 223, and the output interface 226 may be directly connected to the host interface 230. Alternatively, all interfaces may be connected to communications bus. In an alternative architecture, the package of the S-EIS unit 120 may be designed to receive the package of the camera unit 116 and the S-EIS unit 120 package may then be mounted on the substrate, for example, in the place of the camera unit 116.

The S-EIS unit 120 may use motion sensor and/or other sensors to determine the motion of the device and to determine the required correction. The motion sensors may be, for example, accelerometers, gyroscopes, and/or magnetometers. Other sensors, such as e.g., pressure sensors may also be used to determine motion. In one aspect, the S-EIS unit 120 comprises all the required (motion) sensors, as indicated in FIG. 2. In other aspects, the (motion) sensors are external to the S-EIS unit 120, and the sensor data is transmitted to the S-EIS unit 120 through the host interface 230. The S-EIS unit 120 may also contain a buffer to store the sensor data, which may be a dedicated buffer or an existing buffer, such as input buffer 142 or output buffer 144. A motion sensor 150 may also be a smart sensor or motion processing unit, with an internal buffer. A smart sensor may refer to a motion sensor that is packaged together with a sensor processor that controls the motion sensor and may perform sensor data processing. The buffer size is generally much smaller than the image buffers, and the exact size depends on the time scale of the stabilization process and the output data rate (ODR) of the motion sensors.

The image stabilization process may be classified into different classes, which may depend on the time scale of the stabilization. Inter-frame stabilization refers to stabilization techniques that correct for the motion of a frame compared to the previous and/or next frame. For example, if the device is moved up from one frame to the next, an object that has not moved in the real world will be captured lower in the image frame. In inter-frame stabilization, this effect is corrected for so that the object does not appear to move down in the image frame, which is apparent as jitter in the images of a video sequence. Intra-frame stabilization refers to stabilization techniques within the time scale of an image frame. In other words, this corrects for motion that would otherwise deform objects in the image data 210 of a captured image frame. For example, if the camera unit 116 is moved from left to right during the capture of an image frame, an object may be skewed in the raw image data 210. These techniques may sometimes also be referred to as rolling shutter correction, which are known to the person skilled in the art.

FIG. 3A-3D show the operation of the S-EIS unit 120 to perform inter-frame stabilization in a continuous output mode. In inter-frame stabilization a cropped image 304 is defined within the captured image frame 301. A cropping margin 302 around a cropped image 304 allows for the cropped image 304 to be selected within a complete image frame 301 in order to correct for the device motion.

Figure 3A:
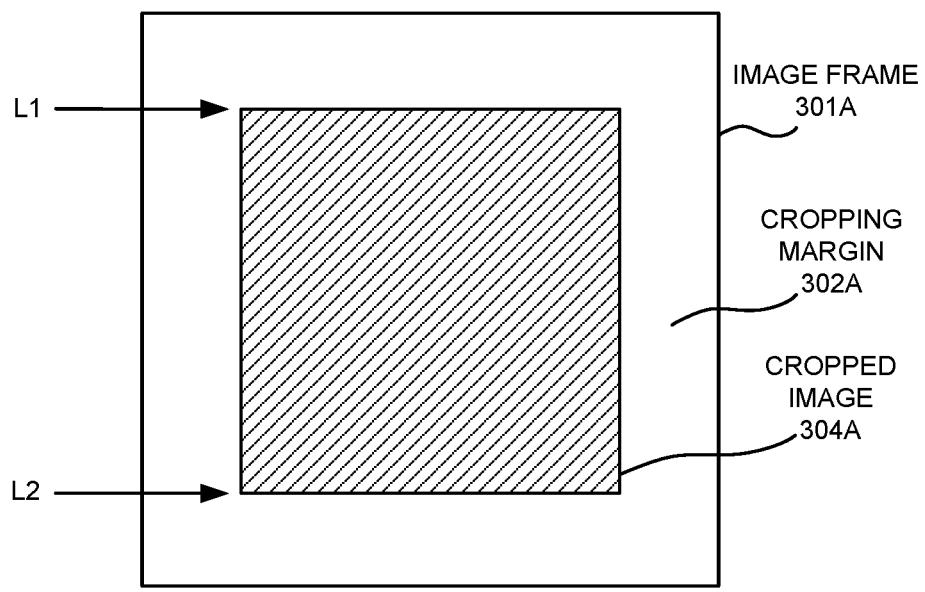
FIGS. 3A-3D show the operation of the S-EIS unit to perform inter-frame stabilization in a continuous output mode.

Referring now to FIG. 3A, a situation is illustrated where the device is in a reference position (i.e., not moving). The reference position and/or orientation of the mobile device (e.g., electronic device 100) may be determined by a (temporal) filtering of the measured position and orientation data from motion sensor(s) 150. For example, a low-pass filtering of the position data may be performed to determine the reference that the stabilization is aiming to obtain. The camera unit 116 outputs the image frame 301A as image data 210, which includes the cropped image 304A and the cropping margin 302A, to the S-EIS unit 120. The S-EIS unit 120 then determines the correct cropped image 304A. In FIG. 3A this means that the image lines from line L1 to image line L2 are output to select the cropped image 304A. The cropping margin left and right are also corrected for by omitting output of data on lines L1 to L2 that is in the cropping margin 302B. The image lines before line L1 and after line L2 are not output since they are not part of the cropped image 304A. In short, S-EIS unit 120 receives the image data 210 for the complete image frame 301A from the camera unit 116, but only outputs the cropped image 304A through the output interface 226. In this example, the input buffer 142 and the output buffer 144 may contain e.g., only one image line (since this example deals with a continuous output mode).

Figure 3B:
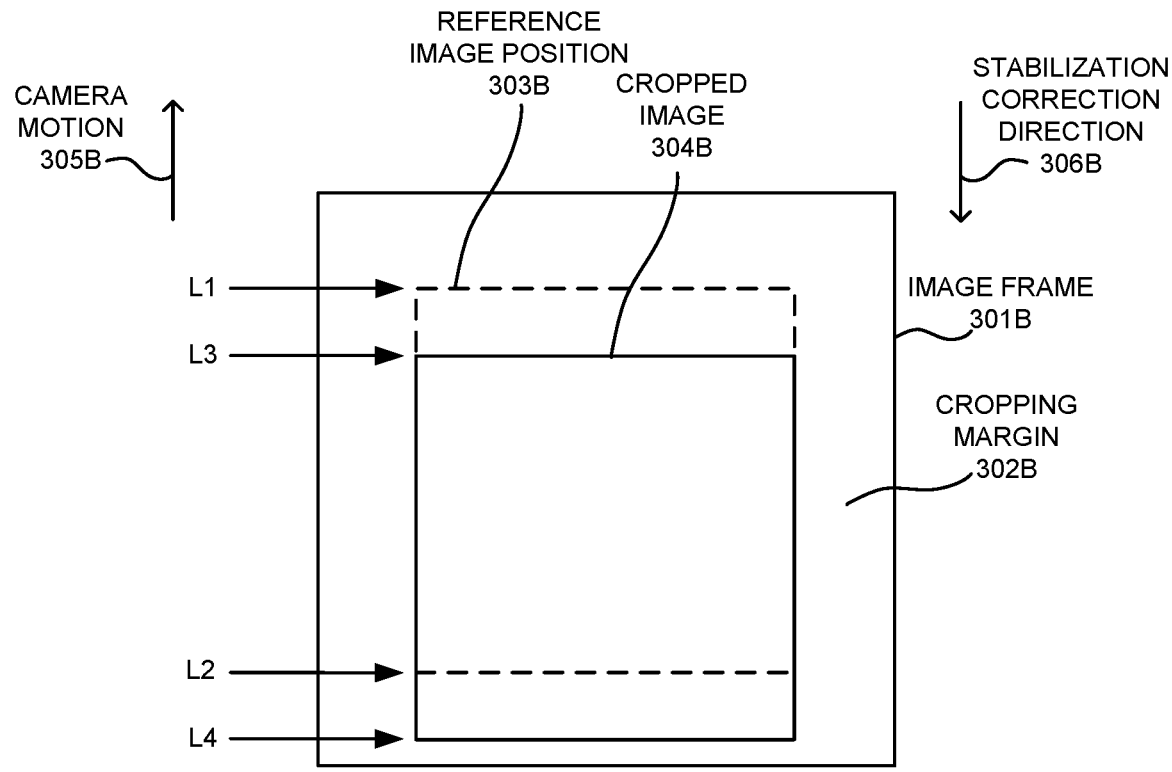

With reference to FIG. 3B, when the device which includes camera unit 116 is moved up from the reference position, as depicted by camera motion 305B, the cropped image 304B is positioned lower (as illustrated by stabilization correction direction 306B) within the image frame 301B (the dashed line represents a reference image position 303B without motion stabilization). The device motion 305B is determined using the motion sensors 150, and the new position of the cropped image 304B is calculated as being from line L3 to line L4. Similar to the previous example of FIG. 3A, only the image data between cropped image lines L3 and L4 are output and none of the image data in the cropping margin 302B is output.

Figure 3C:
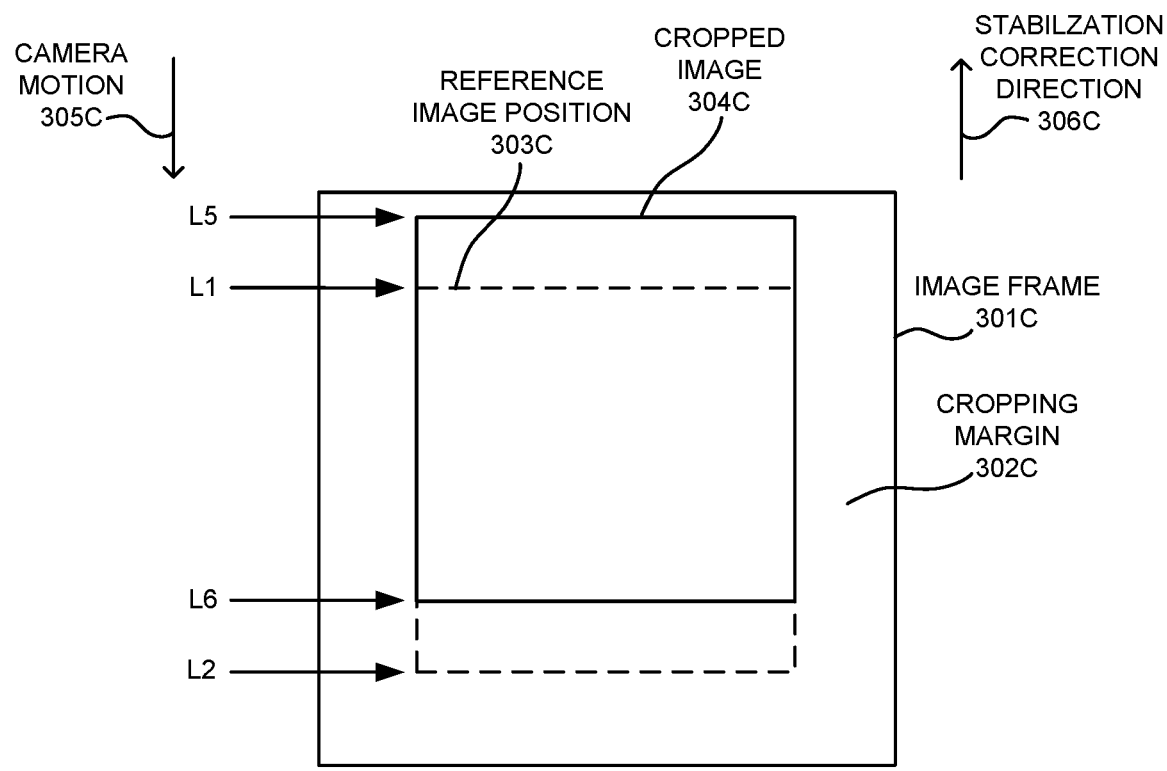

With reference to FIG. 3C, when the device which includes camera unit 116 is moved down from the reference position, as depicted by camera motion 305C, the cropped image 304C is positioned higher with the image frame 301C (as illustrated by stabilization correction direction 306C) within the image frame 301C (the dashed line represents a reference image position 303C without motion stabilization). The device motion 305C is determined using the motion sensors 150, and the new position of the cropped image 304C is calculated as being from line L5 to line L6. Similar to the previous examples of FIGS. 3A and 3B, only the image data between cropped image lines L5 and L6 are output and none of the image data in the cropping margin 302C is output.

In the example of FIGS. 3A-3C, the cropped image size is smaller than the initial image size output by the camera unit 116. This may be acceptable in some aspects, but in other aspects the S-EIS unit 120 may also resize the cropped image to correspond to the initial image size and so that stabilized image data 220 has the same format as image data 210. Because each image line in a cropped image 304 corresponds to more than a single image line in an outputted image that is enlarged, input buffer 142 and/or output buffer 144 may need to be larger than a single image line. Thus, because of the rescaling the input buffer 142 and/or the output buffer 144 may be adapted in size depending on the section of a cropped image 304 that is processed for the rescaling. Rescaling using several image lines may result in better image quality than rescaling on a line by line basis. As such, the quality requirements may determine the buffer sizes. Although FIGS. 3A-3C show the effect and correction of up and down motion, a similar strategy may be applied for motion in the lateral (left-right) direction, so that any motion in the image plane may be corrected.

Figure 3D:
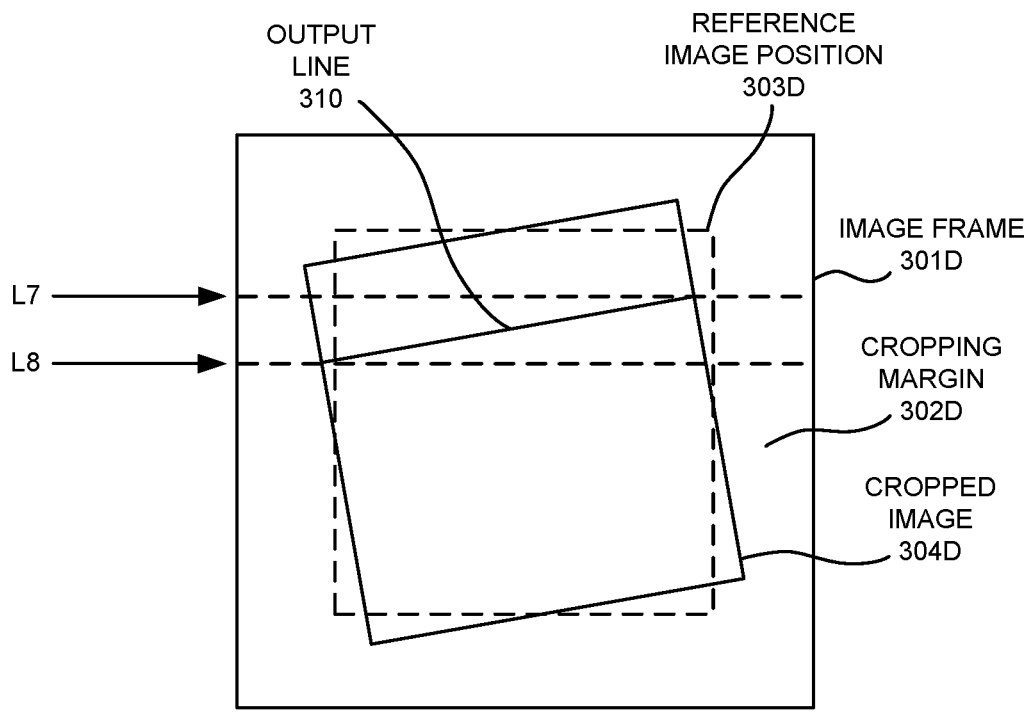

Attention is directed to FIG. 3D. In the examples of FIGS. 3A-3C, the stabilization correction can correct for any translational motion, or rotational motion of the camera unit along the pitch and yaw angles of the device which includes camera unit 116, where the pitch angle refers to the rotation over the horizontal axis and the yaw angle refers to the rotation over the vertical axis. However, any rotation along the optical axis (i.e., the roll axis) of camera unit 116 results in a rotation of the desired cropped image within the image frame 301D, as depicted in FIG. 3D. Dashed box 303D illustrates a reference image position 303D, uncorrected for roll. The solid line marked 'output line 310' in FIG. 3D represents a desired output line of the S-EIS unit 120. The output line 310 contains image data 210 that covers the input image segment from lines line L7 up to line L8 along the output line 310 to form image data of cropped image 304D. Image data 210 in cropping margin 302D is not included in cropped image 304D. This means that to determine the output line 310, the S-EIS unit must buffer the image segment from line L7 up to line L8 in the input buffer 142. The size of the input buffer 142 required for this correction depends on the angle of roll rotation away from a horizon that is perpendicular to gravity. As discussed, in some embodiments, a gravity vector obtained by processor 130 from motion sensors 150 may be used to determine this angle of roll and thus the correction needed. Other techniques for determining angle of roll may also be utilized. Therefore, depending on the required correction angle, the S-EIS unit 120 may determine the required size of the input buffer 142. A limit may be set to the maximum angle of roll that can be corrected. The limit may correspond to a size of the required physical memory available and/or other factors. If a rotation above this angle of roll takes place, the correction may not be performed or may only be performed up to the maximum angle of roll, which means that the stabilization is not 100%, and some remaining rotational effects exist. In another embodiment, the roll may be referenced from a previous orientation or from a filtered orientation instead of gravity.

The examples of FIGS. 3A-3D have thus far been described with the camera unit 116 operating in continuous output mode. The S-EIS unit 120 may also provide image stabilization with the camera unit in a buffered output mode. In a buffered output mode the camera unit 116 may send a signal or trigger when the next image or image segment is available. The image data 210 may be stored in a camera buffer 215 within the camera unit 116, or the image data may be readout directly from the image sensor 118, without the need for an additional buffer or memory. The S-EIS unit 120 receives this first signal or trigger, performs the stabilization, and then outputs a second signal through the host interface 230 to indicate that the stabilized image data 220 is ready in the output buffer 144. The S-EIS unit 120 may also make sure the first signal is not received by the host interface 230 in order to make sure that the image is stabilized first. As such, S-EIS unit 120 may delay the first signal, or may replace the first signal with the second signal when the stabilization has been performed. In this buffered output mode, the S-EIS unit 120 will use the motion sensor data in a similar manner to the examples explained above, but now to determine which sections of the camera buffer 215 or image sensor 118, corresponding to the cropped image 304, to read. In FIG. 3A, this means reading out image data 210 in camera buffer 215 from lines L1 to L2; in FIG. 3B, this means reading out image data 210 in camera buffer 215 from lines L3 to L4; in FIG. 3C, this means reading out image data 210 in camera buffer 215 from lines L5 to L6; and in FIG. 3C, this means reading out image data 210 in the camera buffer from lines L7 to L8 along lines parallel to output line 310. Depending on the size of the input buffer 142, a single line or an image section may be read, rescaled if desired, and then written to the output buffer 144. Once the last image data 210 from the cropped image 304 is written into the output buffer 144 as stabilized image data 220, the second signal or trigger may be sent. In the example of the rotation in FIG. 3D, the camera buffer 215 may be read section by section, wherein each section completely comprises the required output stabilized image data 220, in this case image section from line L7 to line L8. After putting each section in the input buffer 142, the S-EIS processor 130 extracts the output line 310, and then the next relevant image section may be written to the input buffer 144. The relevant image section may depend on the required stabilization, as demonstrated in relation to FIG. 3D. Alternatively, the S-EIS processor 130 may determine the exact buffer addresses corresponding to the image data point on the output line, and only read these addresses directly from the camera buffer 215 or image sensor 118. The image data points on the output line may include some margin by taking image data points around the line, which may help improve image quality, for example when resizing is required. As mentioned above, the stabilized image data 220 may also be written back to camera buffer 215, after which the second signal may be send.

In the buffered output mode, the S-EIS processor 130 may determine which pixels in the camera buffer 215 have to be read, based on the data from the motion sensor(s) 150 and the required rescaling. The reading from the camera buffer 215 and the writing into the output buffer 144 may be performed on a sub-pixel level to obtain the best image quality.

The S-EIS unit 120 may also operate to change the output mode from a continuous output mode to a buffered output mode, or vice versa. In the former, the S-EIS unit 120 receives the image data 210 e.g., line-by-line, fills the output buffer 144 with the stabilized image 220, and then sends the second signal or trigger. In the latter, the S-EIS unit 120 receives the first signal that the image data 210 is available in the camera buffer 215, and then starts reading the image data 210 e.g., line-by-line, and outputting in a continuous mode. The mode change may be applied when the host processor 110 requests a certain mode, but the camera unit 116 cannot operate in this mode. In this case, the S-EIS unit 120 performs the mode change in order to provide the host processor 110 the requested mode, using the mode the camera unit 116 is capable of. The mode change may additionally or alternatively be applied when processor 130 of the S-EIS unit 120 requests a certain mode, and/or a certain mode produces optimum image quality or image stabilization results. As such, the S-EIS unit 120 may determine the optimum mode depending on the detected context (e.g., the motion characteristics) and select the most appropriate mode.

In the examples above it was shown how different parts of the original image may be used for a cropped image 304 to perform the image stabilization. A cropped image 304 may be rescaled to the original image size so that the output of the S-EIS unit 120 mimics the native image size of the image sensor 118. An additional effect of cropping different parts of the image frame 301 is that the stabilized image data 220 becomes available at different times depending upon the portion that is cropped. For example, if the top part of an image frame 301 is cropped, the image data is available faster than when the bottom part of an image frame 301 is cropped. Effectively, this means that the time from one frame to the other may not be identical depending on the image stabilization. The host device that includes camera unit 116 may expect the images at a certain time interval, so this effect of varying time of availability of stabilized image data 220 may need to be corrected through the addition of delay to some stabilized image data. This effect and the correction is explained in conjunction with the discussion of FIG. 4A to 6. In FIGS. 4A-6, for purposes of conciseness only vertical cropping and continuous output is illustrated where a complete image is read to input buffer 142, this image data 210 is then cropped and rescaled into stabilized image data that is written to output buffer 144. It should be appreciated that other types of cropping and output combinations may be implemented in a similar fashion to those illustrated in FIGS. 4A-5C.

Figure 4A:
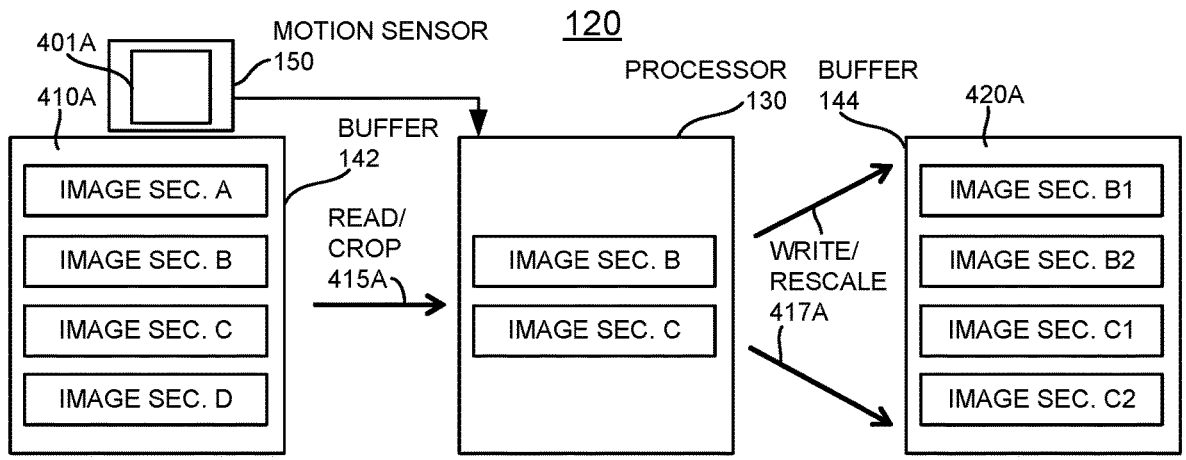
FIG. 4A shows an example of image rescaling performed by a S-EIS unit, in accordance with various aspects of the present disclosure.

FIG. 4A shows an example of image rescaling performed by S-EIS unit 120, in accordance with various aspects of the present disclosure. As depicted, buffer 142 includes image data 410A which may be represented as image sections A, B, C, and D. Box 401A represents motion data, in the form of a vector, measured by motion sensor(s) 150 simultaneously with the capture of image data 410A. Box 401A is depicted as being empty, meaning there is no motion data. This may correspond to the stabilized image and lack of camera motion of FIG. 3A. Processor 130 analyzes this absence of motion data and determines that no motion stabilization correction needs to be performed along with any other transformations of image data 410A. Processor 130 performs a cropping operation on image data 410A by selectively reading, in read operation 415A only a portion of the image data from either image sensor 118 or camera buffer 215 (illustrated in FIG. 2), namely the image data from image sections B and C but not from image sections A and D (of note, only vertical cropping is considered here in this example). If processor 130 was only cropping image data 410A, image sections B and C would be rewritten in their same form into buffer 144 as stabilized image data 420A. However, in the illustrated example, the selectively read image data from image sections B and C is also rescaled by processor 130, in write operation 417A, such as by rescaling image section B and section C to cover the entire image frame. This is schematically represented by converting image section B in image sections B1 and B2, and converting image section C in image sections C1 and C2. The scaling factor depends on the cropping factor, and is in most aspects inversely proportional. Any of the output modes as discussed above may be applied here, such as e.g., a continuous output mode or a buffered output mode.

With respect to FIG. 4A, due to the rescaling, the data from image section B of image data 410A takes up twice the data space in stabilized image data 420A as it took up in image data 410A, and data from image section C of image data 410A takes up twice the data space in stabilized image data 420A as it took up in image data 410A. It is appreciated that other scaling could take place by using other scale factors and or by averaging or blending together aspects of the data (such as to create a blended row between image section B2 and image section C1) prior to writing it into buffer 144. In other embodiments, the scaling factor can be greater or less than two, depending on the cropping factor or to what extend the image should be rescaled to the original size.

Figure 4B:
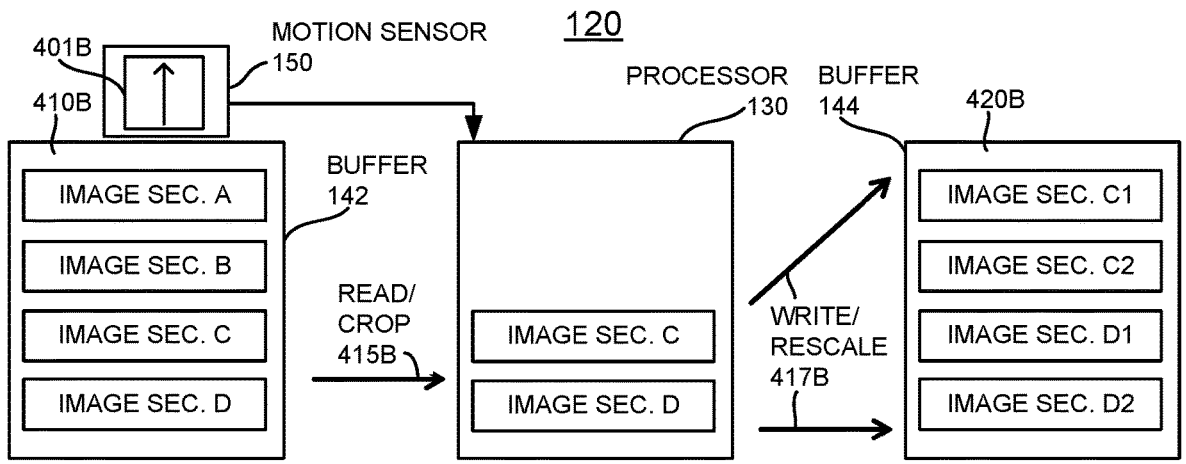
FIG. 4B shows an example of electronic image stabilization along with image rescaling performed by a S-EIS unit, in accordance with various aspects of the present disclosure.

FIG. 4B shows an example of electronic image stabilization along with image rescaling performed by S-EIS unit 120, in accordance with various aspects of the present disclosure. As depicted, buffer 142 includes image data 410B which may be represented as image sections A, B, C, and D. Box 401B represents motion data, in the form of a vector, measured by motion sensor(s) 150 simultaneously with the capture of image data 410B. Box 401B is depicted as having an upward vector, meaning there was upward motion of the image sensor 118 during the capture of image data 410B. This may correspond to the non-stabilized image and cameral motion of FIG. 3B. Processor 130 analyzes this upward vector and determines that an inverse reading (downward) should be performed as a motion stabilization correction, along with any other transformations of image data 410B. Processor 130 performs a cropping and stabilization correction operation on image data 410B by selectively reading only a portion of the image data from either image sensor 118 or camera buffer 215 (illustrated in FIG. 2), in read operation 415B, only a portion of the image data; namely by reading downward into image data 410B (in the opposite direction of the motion vector 401B) the image data from image sections C and D but not reading the image data from image sections A and B (of note, only vertical cropping is considered here in this example). If processor 130 was only cropping image data 410B, image sections C and D would be rewritten in their same form into buffer 144 as stabilized image data 420B. However, in the illustrated example, the selectively read image data from image sections C and D is also rescaled by processor 130, in write operation 417B, such as by such as by rescaling image section C and section D to cover the entire image frame. This is schematically represented by converting image section C in image sections C1 and C2, and converting image section D in image sections D1 and D2. The scaling factor depends on the cropping factor, and is in most aspects inversely proportional. Any of the output modes as discussed above may be applied here, such as e.g., a continuous output mode or a buffered output mode.

With respect to FIG. 4B, due to the rescaling, the data from image section C of image data 410B takes up twice the data space in stabilized image data 420B as it took up in image data 410B, and data from image section D of image data 410A takes up twice the data space in stabilized image data 420B as it took up in image data 410B. It is appreciated that other scaling could take place by using other scale factors and or by averaging or blending together aspects of the data (such as to create a blended row between image section C2 and image section D1) prior to writing it into buffer 144. In other embodiments, the scaling factor can be greater or less than two, depending on the cropping factor or to what extend the image should be rescaled to the original size.

Figure 4C:
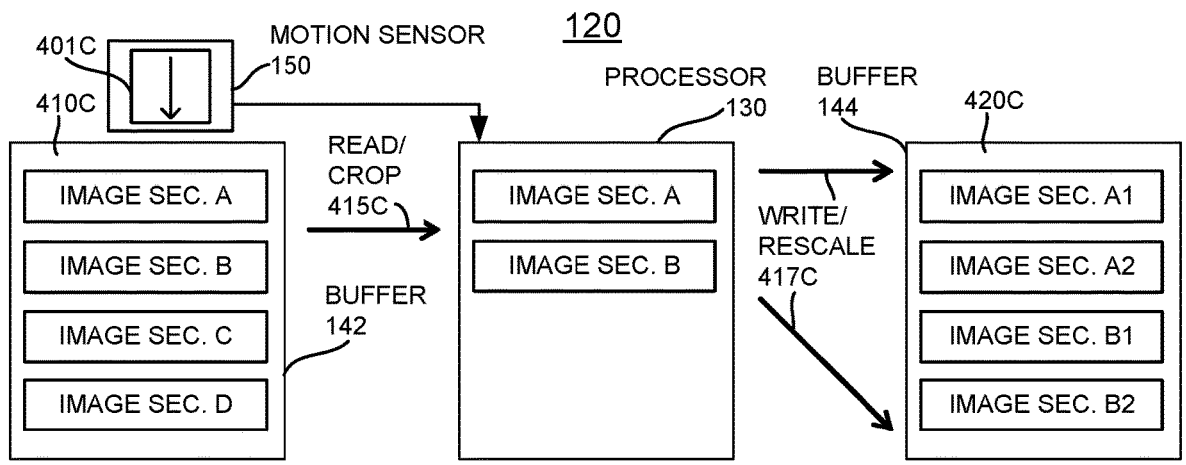
FIG. 4C shows a second example of electronic image stabilization along with image rescaling performed by a S-EIS unit, in accordance with various aspects of the present disclosure.

FIG. 4C shows a second example of electronic image stabilization along with image rescaling performed by S-EIS unit 120, in accordance with various aspects of the present disclosure. As depicted, buffer 142 includes image data 410C which may be represented by image sections A, B, C, and D. Box 401C represents motion data, in the form of a vector, measured by motion sensor(s) 150 simultaneously with the capture of image data 410C. Box 401C is depicted as having an downward vector, meaning there was downward motion of the image sensor 118 during the capture of image data 410C. This may correspond to the non-stabilized image and cameral motion of FIG. 3C. Processor 130 analyzes this downward vector and determines that an inverse reading (upward) should be performed as a motion stabilization correction, along with any other transformations of image data 410C. Processor 130 performs a cropping and stabilization correction operation on image data 410C by selectively reading only a portion of the image data from either image sensor 118 or camera buffer 215 (illustrated in FIG. 2), in read operation 415C, only a portion of the image data; namely by reading upward into image data 410C (in the opposite direction of the motion vector 401C) the image data from image sections A and B but not reading the image data from image sections A and B (of note, only vertical cropping is considered in this example). If processor 130 was only cropping image data 410C, image sections A and B would be rewritten in their same form into buffer 144 as stabilized image data 420C. However, in the illustrated example, the selectively read image data from image sections A and B is also rescaled by processor 130, in write operation 417B, such as by rescaling image section A and section B to cover the entire image frame. This is schematically represented by converting image section C in image sections A1 and A2, and converting image section B in image sections B1 and B2. The scaling factor depends on the cropping factor, and is in most aspects inversely proportional. Any of the output modes as discussed above may be applied here, such as e.g., a continuous output mode or a buffered output mode.

With respect to FIG. 4C, due to the rescaling the data from image section A of image data 410C takes up twice the data space in stabilized image data 420C as it took up in image data 410C, and data from image section B of image data 410C takes up twice the data space in stabilized image data 420C as it took up in image data 410C. It is appreciated that other scaling could take place by using other scale factors and or by averaging or blending together aspects of the data (such as to create a blended row between image section C2 and image section D1) prior to writing it into buffer 144. In other embodiments, the scaling factor can be greater or less than two, depending on the cropping factor or to what extend the image should be rescaled to the original size.

Figure 5A:
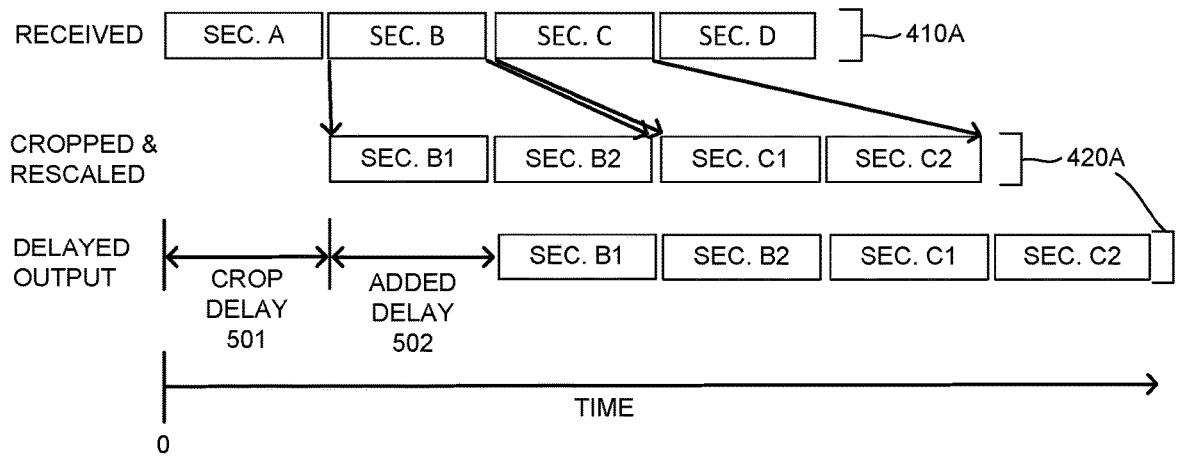
FIG. 5A illustrates a timeline for the example image rescaling of FIG. 4A, in accordance with various aspects of the present disclosure.

FIG. 5A illustrates a timeline 500A for the example image rescaling of FIG. 4A, in accordance with various aspects of the present disclosure. In FIG. 5A, time starts on the left side of the time line at Time 0, and increases in duration as the timeline proceeds to the right. On the top line of data, at Time 0, section A of image data 410A is buffered into buffer 142, after which sections B, C, and D of image data 410A are consecutively received. Due to the cropping, that is illustrated on the middle line of data, image section A is not output, so the first relevant image section is image section B, which is converted into image sections B1 and B2. In this example, it is assumed that the processing time can be neglected. In case the processing time may not be neglected, this would add another (variable) delay, which may be corrected for. A crop delay 501 in the output of stabilized image data 420A is introduced due to cropping image data written into buffer 144. To keep the overall delay of FIG. 5A uniform with the output delay shown in FIGS. 5B and 5C, as is illustrated on the bottom line of data an additional added delay 502 is introduced. This added delay 502 depends on the cropping, and therefore depends indirectly on the motion. One or more of the crop delay 501 and the added delay 502 may also include, or be adapted to include, processing time in S-EIS unit 120. The principle is to adapt this added delay 502 to the cropping, so that the stabilized image data 420A may always be output at the same time relative to the output of other stabilized image data. This means that the stabilized image data 420A is delayed with respect to the original image data 410A, but that this delay is constant when compared to the output of other stabilized image data 420, and independent of the motion.

Figure 5B:
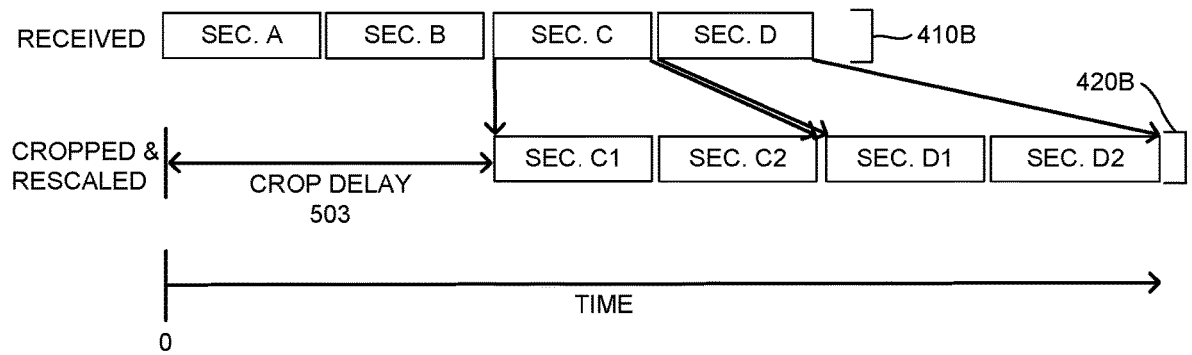
FIG. 5B illustrates a timeline for the example electronic image stabilization along with image rescaling of FIG. 4B, in accordance with various aspects of the present disclosure.
Figure 5C:
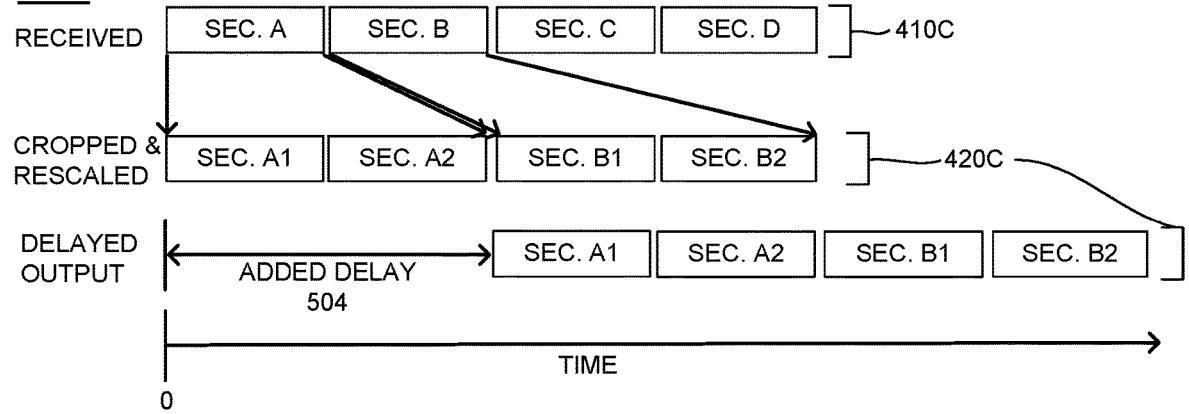
FIG. 5C illustrates a timeline for the example electronic image stabilization along with image rescaling of FIG. 4C, in accordance with various aspects of the present disclosure.

FIG. 5B illustrates a timeline 500B for the example electronic image stabilization along with image rescaling of FIG. 4B, in accordance with various aspects of the present disclosure. In FIG. 5B, time starts on the left side of the time line at Time 0, and increases in duration as the timeline proceeds to the right. On the top line of data, at Time 0, section A of image data 410B is buffered into buffer 142, after which sections B, C, and D of image data 410B are consecutively received. Due to the cropping, that is illustrated on the bottom line of data, image section A and image section B are not output, so the first relevant image section is image section C, which is converted into image sections C1 and C2. This example, where the cropping is performed in the lowest possible section of the image, causes the largest possible crop delay 503, so no additional delay in the output of stabilized image data 420B is introduced before re-writing data to buffer 144. FIG. 5B represents a maximum amount of inherent cropping delay and no delay is added (as illustrated in FIGS. 5A and 5C) to keep the overall delay uniform with the output delay shown in FIGS. 5A, 5B, and 5C. The crop delay 503 may also include a delay due to processing time in S-EIS unit 120.

FIG. 5C illustrates a timeline 500C for the example electronic image stabilization along with image rescaling of FIG. 4C, in accordance with various aspects of the present disclosure. In FIG. 5C, time starts on the left side of the time line at Time 0, and increases in duration as the timeline proceeds to the right. In the top line of data, at Time 0, section A of image data 410C is buffered into buffer 142, after which sections B, C, and D of image data 410C are consecutively received. As is illustrated on the middle line of data, no delay in the output of stabilized image data 420C is introduced by cropping or by rescaling section A of image data 410C into sections A1 and A2 of image data or the rescaling of section B of image data 410C into sections B1 and B2 of stabilized image data 420C because the data is at or near the beginning of image data 410C. Because in this minimum delay case there are no inherent or cropping delays of the type seen in FIGS. 5A and 5B, a long section of added delay 504 may be added to keep the overall output delay associated with output of stabilized image data 420C in FIG. 5C equal to the output delay seen in FIG. 5A and FIG. 5B. The added delay 504 may also include, or be adapted to include, processing time in S-EIS unit 120.

In the examples of FIGS. 4A through and 5C, the focus has been on vertical cropping to explain the method in a straightforward manner. However, the same principles also apply when the cropping is done in the horizontal direction, although these delays will be limited since they are within an image line. These examples show that in some aspects, an adaptive delay is used to compensate for any inherent or cropping delays, such that the image output from the S-EIS unit 120 have a constant frame rate and an identical time span from image to image. Because the cropping depends on the detected motion, the adaptive delay also depends on the motion, so the processor 130 can determine the added delay based on the detected motion. The maximum amount of applied extra delay depends on the maximum cropping percentage.

In the examples of FIGS. 4A through 5C, a complete image is written in input buffer 142. In some embodiments, the amount of available memory or buffer size of buffer 142 may be smaller than a complete image, since this may reduce costs or size. In a continuous output mode, the buffer size may be reduced to a minimum. However, the cropping and adaptive delays may put certain demands on the buffer size. In the example illustrated in FIG. 5B, no extra delay is added, and the processor 130 may start with rescaling image section C into image sections C1 and C2 and immediately output the rescaled image section. However, due to the rescaling, image section D is received while the processor is still occupied outputting image section C2, and image sections D1 and D2, which are based on image section D are only output later. In this example, the input buffer 142 must be large enough to store image section D until the output of image section C2 is finished. This delay, and thus the required buffer size, depends on the cropping and rescaling factor, where a big rescaling factor requires a large buffer (no rescaling requires no buffer). When adding the additional delay, the required buffer size increases further. As is shown in FIG. 5A, the image section C is only output after image section B2 is output, and due to the added delay the time from the start of image section C and the start of the output of image section C1, now equals twice the length of an image section. This shows that the aspect of the added delays increases the required minimum buffer size. The required buffer size may correspond to the actual physical buffer size, meaning that based on the allowed maximum cropping and consequent rescaling, the S-EIS is designed with just enough buffer memory to function properly and apply the correct rescaling. If the design must allow for the additional delays, the required buffer size is larger. The required buffer size may correspond to the activation or operation of the required buffer size within a larger physical buffer. In other words, although the memory may physically contain a larger buffer, only part of the buffer is activated electronically, which may minimize power resource requirement.

Figure 6:
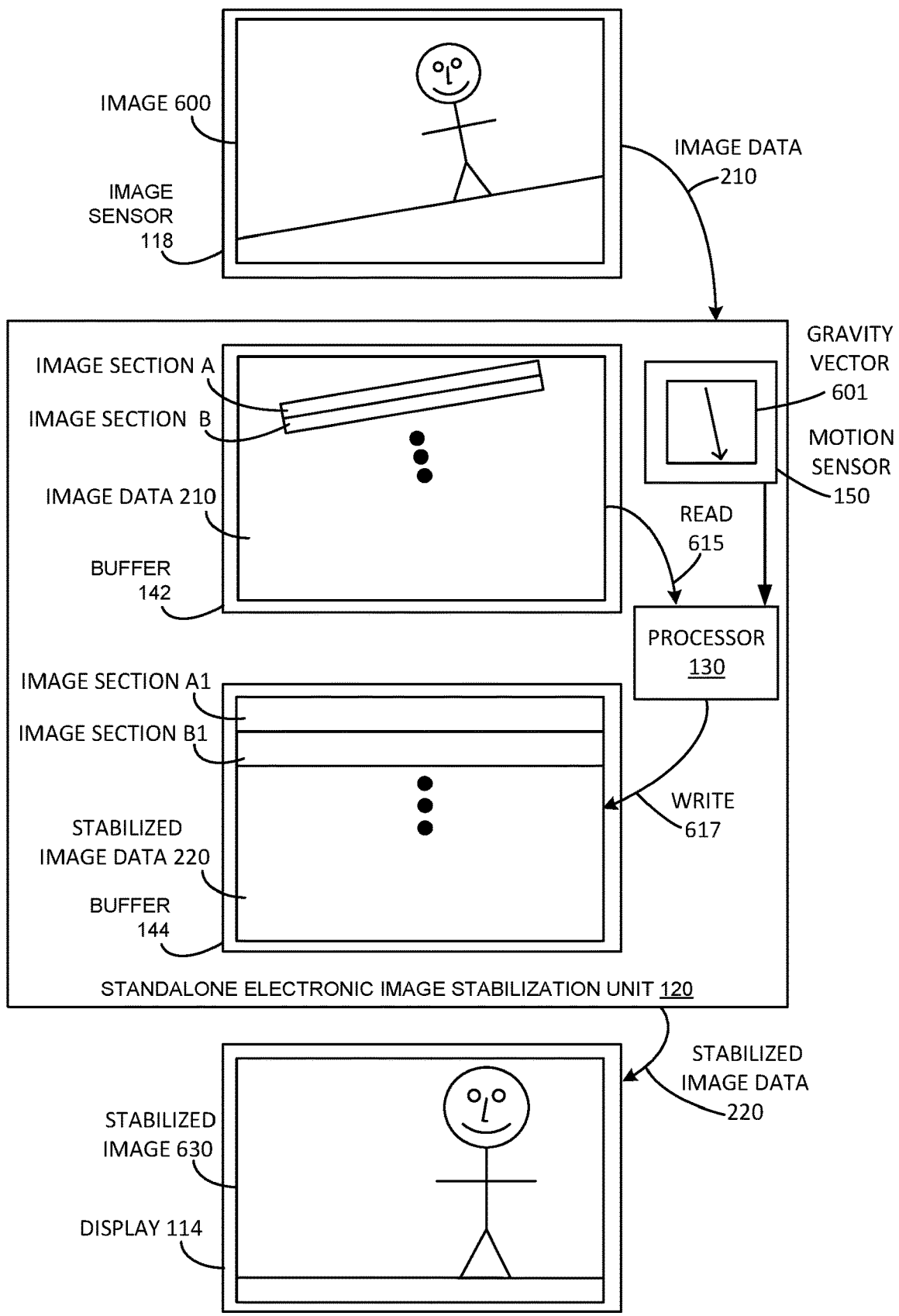
FIG. 6 illustrates an example of electronic image stabilization performed by a S-EIS unit, in accordance with various aspects of the present disclosure.

FIG. 6 illustrates an example of electronic image stabilization performed by a S-EIS unit 120, in accordance with various aspects of the present disclosure.

FIG. 6 shows another embodiment, which is similar to the example described in relation to FIG. 3D, in the sense that it deals with rotation, and a buffering method is more similar to the example of FIGS. 4A-5C. Normally, when considering image stabilization, it refers to removing any unwanted movement of the user, when maintaining the desired motion. For example, a user may be panning a camera but also trembling at the same time. The effect of the trembling should be removed, but the panning effect should not be affected. The motion sensor data may be filtered, for example by a low-pass filter, to determine the desired motion (i.e., panning). The remaining (trembling) motion relative to this desired motion is then corrected in the image stabilization. The stabilization removes the undesired motion but keeps the desired motion over time. If the user rotates electronic device 100 and/or camera unit 116 on purpose over a desired angle, but also trembles when recording the images, the goal of the stabilization is to remove the effect of the trembling, while still maintaining the rotation of the image which was done on purpose. The intended motion is determined by analyzing the motion data over a larger period. As such, when the user holds electronic device 100 and/or camera unit 116 at an angle (as an average orientation), this rotational effect may not be corrected for. The example of FIG. 6 shows that the image stabilization can also be used to correct the effect of the user not holding the camera level with the horizon. In this case, the motion sensors 150 are used to determine the orientation of the camera with respect to the gravity vector, and then correct for this orientation misalignment. When this correction is active, the user cannot hold the camera intentionally at an angle, since this effect would be corrected, while in the examples of FIGS. 3A-3D any stable orientation at an angle would not be corrected. A threshold angle may be used to determine if the user if intentionally or unintentionally tilting the camera, where a tilt angle above the threshold angle is indicative of an intentional tilt.

In FIG. 6, an image 600 of a scene is captured by image sensor 118 of camera unit 116 and represented digitally by image data 210. Image data 210 is buffered into buffer 142. In some embodiments, buffer 142 operates as the image buffer for image sensor 118. In other embodiments, processor 130 selectively obtains all or a sub-portion of the image data from image sensor 118 or camera buffer 215 (illustrated in FIG. 2), and buffers it into buffer 142. Processor 130 also obtains motion data, in the form of gravity vector 601, from motion sensor(s) 150. Gravity vector 601 was measured simultaneously with the capture of image data 210 and provides the ability to determine a roll offset or skewing from vertical along the optical axis. In other words, the gravity vector 601 is used to determine how much the user is tilting electronic device 100 and/or camera unit 116 with respect to gravity. The direction of gravity vector 601 represents its displacement from a normal vertical gravity vector. An analysis of gravity vector 601 by processor 130 indicates that it is skewed approximately 10 degrees from vertical, meaning that image sensor 118 was canted or rolled approximately ten degrees from vertical when image data 210 was captured. In one embodiment, this 10 degree skewing of gravity vector 601 from vertical does not exceed a pre-determined threshold deviation, which would be associated with a purposeful canting of camera unit 116. This pre-determined threshold may be adapted to the user or control by the user. As such, processor 130 proceeds to electronically stabilize image data to correct for this (presumed) unintentional rolling of image sensor 118 from level with horizon. To perform a stabilization correction, processor 130 performs a read operation 615 to read image data 210 section by section (e.g., image section A, image section B, etc.) at an angle orthogonal to gravity vector 601. Reading in this fashion results in stabilized image data 220 that removes or reduces the rolling away from level with horizon. Processor 130 then performs a write operation 617 to write image section A, image section B, etc., into buffer 144 as stabilized image data 220. As will be discussed below, processor 130 may also perform other operations such as resizing, cropping, filtering while performing the read 615 and write 617 operations to achieve stabilized image data 220. After an entire image frame of stabilized image data 220 is written into buffer 144, the stabilized image data 220 may be output from S-EIS unit 120 under the direction of processor 130 or based on a request from an external entity such as application processor 110. In FIG. 6, stabilized image data 220 has been output to display 114 where it is displayed as stabilized image 630. The example was described here with the image being written in completely into buffer 142, but the same principles will work with any other mode describe above, such as the continuous output mode or the buffer output mode. FIG. 6 also shows and image section A and B have been cropped and afterwards rescaled to image section A1 and B1, as in the other aspects of embodiments discussed herein.

Figure 7:
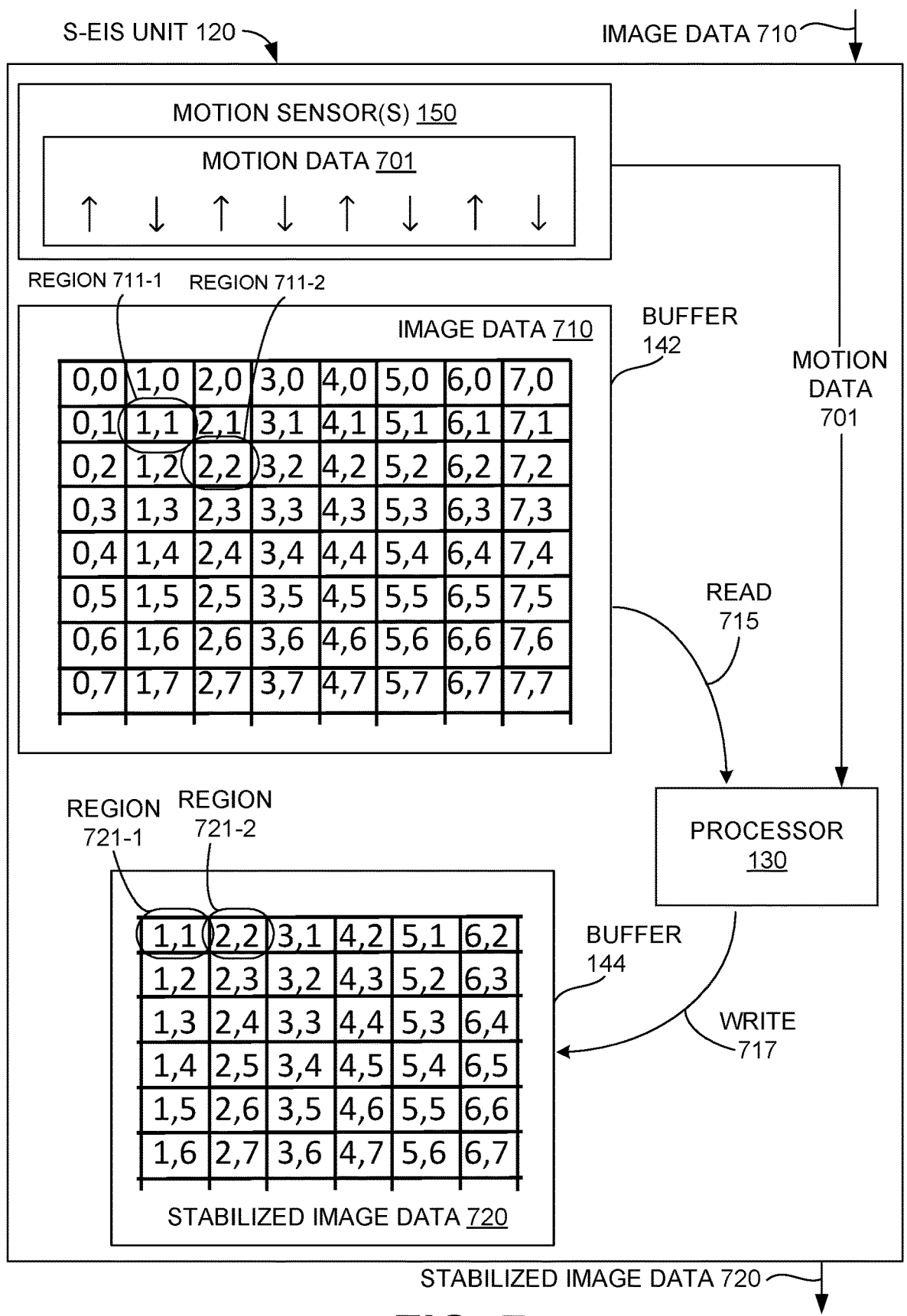
FIG. 7 illustrates an example of electronic image stabilization performed by a S-EIS unit, in accordance with various aspects of the present disclosure.

Thus far, the examples have focused on inter-frame image stabilization, but the same principles may apply to intra-frame image stabilization. FIG. 7 shows an example of intra-frame image stabilization where different image sections within image data 710 of an image frame are corrected for motion that takes place during the capturing of the image data 710 of the image frame. This may refer to image section being moved, rotated, rescaled, or skewed with respect to other section of the image. The image sections may be lines, pixels, groups of line, groups or blocks of pixels, or any other form. The example of FIG. 7 uses rectangular image blocks, which may be of a pixel or sub-pixel level.

FIG. 7 illustrates an example of electronic image stabilization performed by a S-EIS unit, such as S-EIS unit 120, in accordance with various aspects of the present disclosure. Image data 710 is obtained from image sensor 118 and buffered into buffer 142. As discussed previously, in some embodiments, buffer 142 operates as the image buffer for image sensor 118. In other embodiments, processor 130 selectively obtains all or a sub-portion of the image data from image sensor 118 and buffers it into buffer 142. Processor 130 also obtains motion data 701 from motion sensors 150. Motion data 701, is represented in FIG. 7 by a series of motion vectors (depicted as directional arrows) positioned above a column of image data 710 that is associated with the motion vector. Processor 130 analyzes the motion data 701 and determines there is an up/down motion, typically associated with jitter, which has impacted the image data 710. To perform a stabilization correction, processor 130 performs read operations 715 to read image data 710 region by region in a manner that eliminates or reduces the jitter motion. For example, when the motion vector is pointing down as it is above the column containing region 711-1, processor 130 reads image data 710 upward in the frame or sub-frame by a distance dictated by the magnitude of the motion vector; the image data that is read is in region 711-1. Similarly, when the motion vector is pointing up as it is above the column containing region 711-2, processor 130 reads image data 710 downward in the frame or sub-frame by a distance dictated by the magnitude of the motion vector; the image data that is read is in region 711-2. Reading in this up/down fashion comprises a stabilization correction that removes or reduces the up/down jitter. Processor 130 performs a write operation 717 to write the data read from region 711-1 into region 721-1, write the data read from region 711-2 into region 721-2, etc., into buffer 144 as stabilized image data 720. As will be discussed below, processor 130 may also perform other operations such as resizing, cropping, filtering while performing the read 715 and write 717 operations to achieve stabilized image data 720. After an entire image frame of stabilized image data 720 is written into buffer 144, the stabilized image data 720 may be output from S-EIS unit 120 under the direction of processor 130 or based on a request from an entity external to S-EIS unit 120, such as application processor 110.

Figure 8:
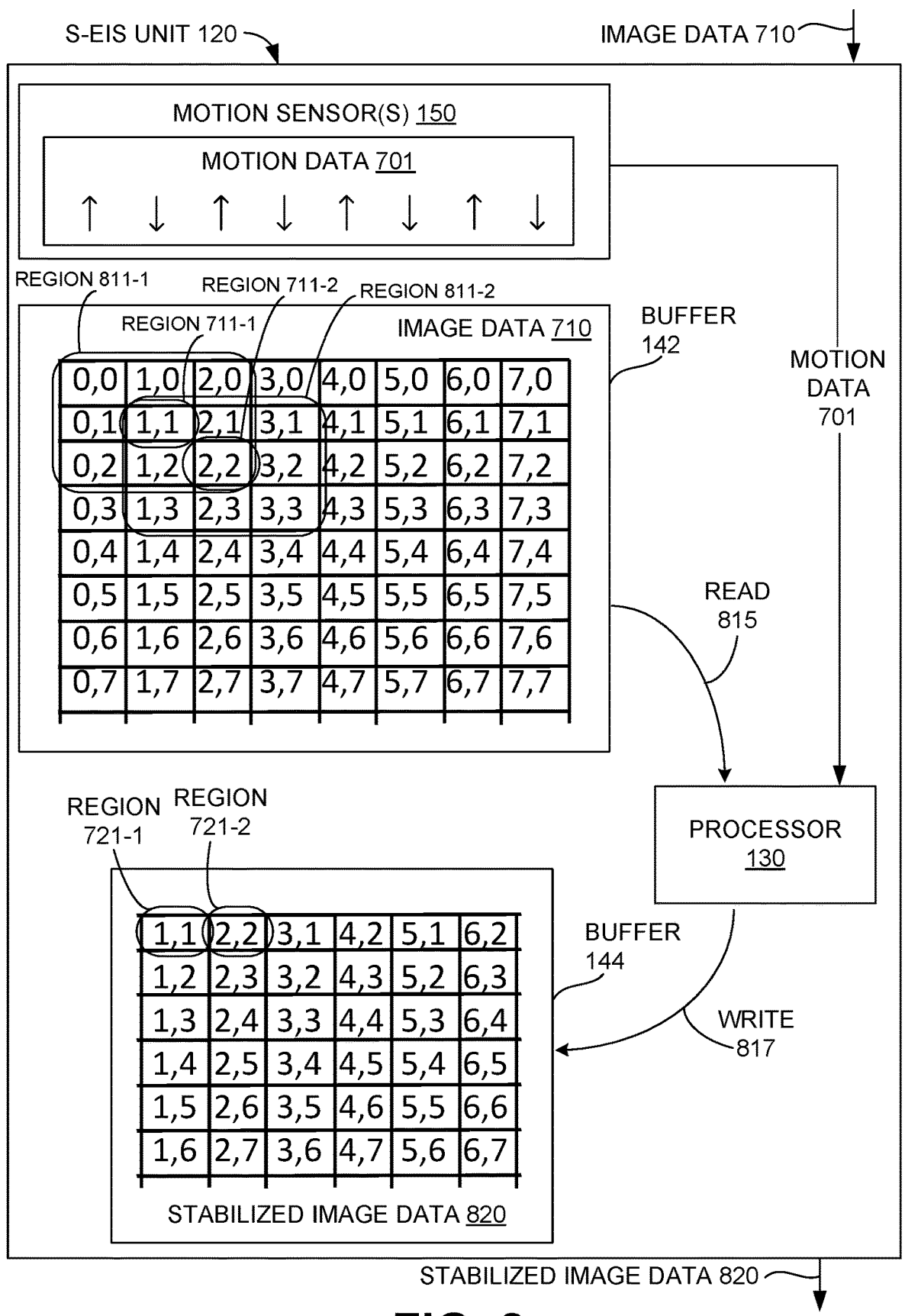
FIG. 8 illustrates an example of electronic image stabilization along with image filtering performed by a S-EIS unit, in accordance with various aspects of the present disclosure.

FIG. 8 illustrates an example of electronic image stabilization along with image filtering performed by a S-EIS unit, such as S-EIS unit 120, in accordance with various aspects of the present disclosure. The example illustrated by FIG. 8 is different from the example illustrated by FIG. 7 in that, in FIG. 8, there is also a depiction of an example of filtering. In FIG. 8, image data 710 is obtained from image sensor 118 and buffered into buffer 142. As discussed previously, in some embodiments, buffer 142 operates as the image buffer for image sensor 118. In other embodiments, processor 130 selectively obtains all or a sub-portion of the image data from image sensor 118 and buffers it into buffer 142. Processor 130 also obtains motion data 701 from motion sensors 150. Motion data 701, is represented in FIG. 8 by a series of motion vectors (depicted as directional arrows) positioned above a column of image data 710 that is associated with the motion vector. Processor 130 analyzes the motion data 701 and determines there is an up/down motion, typically associated with jitter, which has impacted the image data 710. To perform a stabilization correction, processor 130 performs read operations 815 to read image data 710 region by region in a manner that eliminates or reduces the jitter motion. For example, when the motion vector is pointing down as it is above the column containing region 711-1, processor 130 reads image data 710 upward in the frame or sub-frame by a distance dictated by the magnitude of the motion vector; the image data 710 that read, in one example, is in region 811-1, which includes and surrounds region 711-1. Similarly, when the motion vector is pointing up as it is above the column containing region 711-2, processor 130 reads image data 710 downward in the frame or sub-frame by a distance dictated by the magnitude of the motion vector; the image data 710 that read, in one example, is in region 811-2, which includes and surrounds region 711-2. Reading in this up/down fashion comprises a stabilization correction that removes or reduces the up/down jitter. Processor 130 further performs a filtering operation by, for example, averaging together all of the information in the 9 sub-regions in region 811-1 to get a single filtered value that can be assigned to the center sub-region 711-1. This filtered value is written, in a write operation 817 by processor 130, into region 721-1 of stabilized image data 820 that is stored in buffer 144. Likewise, processor 130 further performs another filtering operation by, for example, averaging together all of the information in the 9 sub-regions in region 811-2 to get a single filtered value that can be assigned to the center sub-region 711-2. This second filtered value is written, in a write operation 817 by processor 130, into region 721-2 of stabilized image data 820 that is stored in buffer 144. It should be appreciated that in some embodiments the averaging can be unweighted (nine summed values divided by nine), while in other embodiments the values in some of the 9 sub-regions, such as the center sub-region, may receive a higher weight such as being added multiple times into the total that is averaged (as if there were more than 9 summed sub-regions). Processor 130 performs this reading, filtering, and writing until an entire frame of stabilized image data is stored in buffer 144. As will be discussed below, processor 130 may also perform other operations such as resizing and cropping while performing the read 815, filter, and write 817 operations to achieve stabilized image data 820. After an entire image frame of stabilized image data 820 is written into buffer 144, the stabilized image data 820 may be output from S-EIS unit 120 under the direction of processor 130 or based on a request from an entity external to S-EIS unit 120, such as application processor 110.

The examples of FIG. 7 and FIG. 8 were described with the image being written in completely into buffer 142, but the same principles will work with any other mode not requiring the complete image to be buffered, as described above in relation to FIGS. 3A-3D, such as the continuous output mode or the buffer output mode. In a continuous output mode, the minimum size of the input buffer 142 depends on the maximum motion amplitude that should be corrected. As is shown in FIG. 7, a single line of image blocks in the output buffer 144 contains image content from two lines of image blocks in input buffer 142, and the larger the amplitude of the motion data that should be covered, the more lines of image blocks need to be stored in the input buffer 142. In the embodiment of FIG. 8, the required buffer is larger due to the extra space associated with the filtering regions.

The S-EIS unit 120 may also be designed and/or configured for a certain predefined specific (stabilization) application. For example, if the electronic device 100 is part of a drone, and camera unit 116 is used to take images from the drone's point of view, S-EIS unit 120 may be specifically designed to stabilize for typical motion of the drone, such as e.g., vibrations due to the rotors. The S-EIS unit 120 may this be designed and configured to remove rotor vibration, and the stabilization parameters, such as e.g., cropping percentage and lateral motion corrections, may be adapted to the rotor vibration characteristics. As such, the S-EIS unit 120 may perform a first image stabilization intended to remove the influence of the rotor vibrations, and after that an optional second stabilization may be performed.

The example embodiments explained above show how the S-EIS unit 120 can be used to perform image stabilization without the use of a GPU. This would provide a low cost alternative way of image stabilization. However, in some devices a GPU may be present, and the image stabilization may be performed either using the S-EIS unit, the GPU, or a combination of both. For example, depending on the context, the detected motion characteristics, or the available power and/or computing resources, application processor 110 or processor 130, may select if the S-EIS unit and/or GPU should be used for the image stabilization. For example, if only small lateral motion is detected that can be corrected by simple operations are shown in relation to FIGS. 3A-3D, the S-EIS unit may be used since this consumes less power resources. When more complicated image transformations are required, a GPU, such as GPU 119 may be used when available. When both systems are used, the S-EIS unit 120 may perform a first (e.g., simpler) image stabilization correction, after which the stabilized image data is output from the S-EIS unit 120 to the GPU which performs a second (e.g., more complicated) image stabilization correction.

Example Methods of Operation

FIGS. 9A-9C illustrate flow diagrams 900 of an example method of electronic image stabilization, in accordance with various aspects of the present disclosure. Procedures of this method will be described with reference to elements and/or components of one or more of FIGS. 1-8. It is appreciated that in some embodiments, the procedures may be performed in a different order than described, that some of the described procedures may not be performed, and/or that one or more additional procedures to those described may be performed. Flow diagrams 900 include some procedures that, in various embodiments, are carried out by one or more processors (e.g., processor 130, application processor 110, or the like) under the control of computer-readable and computer-executable instructions that are stored on non-transitory computer-readable storage media (e.g., application memory 111, internal memory 140, or the like). It is further appreciated that one or more procedures described in flow diagrams 900 may be implemented in hardware, or a combination of hardware with firmware and/or software.

With reference to FIG. 9A, at procedure 910 of flow diagram 900, in various embodiments, image data obtained by a processor from an image sensor disposed in an electronic device is buffered. The image data is buffered by the processor into a memory buffer. With reference to FIG. 1 and FIG. 2, in various embodiments, this comprises processor 130 of S-S-EIS unit 120 obtains (receiving, reading, or the like) image data from image sensor 118 and then buffering the image data into a first buffer. The first buffer may be a portion of internal memory 140, such as buffer 142, in various embodiments. In other embodiments, the first buffer may be a standalone buffer that is internal or external to S-EIS unit 120. In some embodiments, this buffer may serve as the primary buffer for image sensor 118. With reference to FIG. 2, in some embodiments, processor 130 may control the addressing and content of registry addresses, such as e.g., registry 207 of camera unit 116 and registry 227 of S-EIS unit 120 in order to obtain image data from camera unit 116 at s-EIS unit 120.

With continued reference to FIG. 9A, at procedure 920 of flow diagram 900, in various embodiments, the processor obtains motion data from a motion sensor disposed in the electronic device. The motion data corresponds with a time of capture of the image data. In other words, the motion data and the image data are synchronized in time such that the motion data represents motion experienced by image sensor 118 during the time of capture of the image data. With reference to FIG. 1, in various embodiments this comprises processor 130 of S-EIS unit 120 (receiving, reading, or the like) motion data (e.g., motion data 601, 701, 401A, 401B, 401C) from motion sensor(s) 150. Motion data may comprise individual data from one or more separate motion sensors (e.g., gyroscope 151, accelerometer 153, and a magnetometer (not depicted)) or fused data from two or more motion sensors 150 (e.g., two or more of a gyroscope 151, an accelerometer 153, and a magnetometer (not depicted)). The motion data may comprise a gravity vector, an orientation (change) vector, a direction of motion vector, a velocity vector, an acceleration vector, and the like, which can be analyzed and interpreted by processor 130.

With continued reference to FIG. 9A, at procedure 930 of flow diagram 900, in various embodiments, the motion data is analyzed by the processor to determine a stabilization correction to apply to the image data. With reference to FIG. 1, in various embodiments, this comprises processor 130 analyzing the obtained motion data. The analysis may comprise determining a change of orientation and/or position, a direction of motion, a gravity vector, a magnitude of motion, whether or not a magnitude of motion or change of orientation meets a predetermined threshold which allows for application of electronic image stabilization corrections to the obtained image data, and if so, which ones. Processor 130 determines, based on the motion data analysis, which stabilization to perform and also determines the stabilization and image correction parameters. Reference is made to the discussion of FIGS. 3A-8 which provide a non-limiting set of example of this analysis and of the stabilization corrections described in procedure 940 of flow diagram 900.

As but one example, consider an embodiment where an obtained motion vector is found to be downward and at a magnitude that is within a range correctable by the electronic image stabilization of S-EIS unit 120. Analysis by processor 130 may determine that processor 130 should perform stabilization corrections to adjust the image data upward by an amount that compensates for the downward magnitude of the motion vector, such that stabilized image data appears to have no upward motion. In one embodiment S-EIS unit 120 can correct for motion artifacts in image data associated with a motion vector that is in a correctable range of, for example, between 1 degree and 20 degrees in a particular direction (e.g., upward, downward, leftward, rightward). In other embodiments, the correctable range for motion vector may have different bounds. Above the bounds of this correctable range for motion vectors, electronically applied stabilization corrections may still be applied, but would not result in stabilized image data that produces an image no motion artifacts. Below the bounds of this correctable range for motion vectors, stabilization corrections may still be applied, but may not result in any user discernable difference between the image data and the stabilized image data. Although this example discusses a downward motion vector, analysis and application of electronic image stabilization may similarly be implemented with motion vectors in other directions, e.g., upward, leftward, rightward, or some other direction. Similarly, combinations of motion vectors within a single image frame of image data, which may occur such as with jitter, can be by analyzed and corrected by processor 130 based on the motion data direction (e.g., upward, downward, leftward, rightward, and the like) and magnitude associated with a discrete sub-portion of the image frame.

It should be appreciated that in some embodiments, processor 130 also analyzes the image data to determine other transformations to apply the image data, such as, but not limited to, cropping the image data, translating the image data, rotating the image data, skewing the image data, resizing the image data, and/or filtering the image data. One or more of these or other transformations can be applied to the image data when processing the image data into stabilized image data. One or more of these transformations may be automatically applied, according to some predetermined instructions, when electronic image stabilization is performed on image data to achieve stabilized image data. For example, correcting for motion vector and/or a gravity vector may require cropping out a smaller portion of the overall image data from an image frame. In some embodiments, this cropped portion may also be resized by some scale factor (either up or down) as the image data is remapped to achieve stabilized image data. Several techniques for such cropping, resizing, and filtering have be described above in conjunction with FIGS. 2-8. It should be appreciated that when electronic image stabilization corrections are implemented these transformations can be accomplished alone with the stabilization correction (e.g., only cropping with electronic image stabilization, only resizing with electronic image stabilization, or only filtering with electronic image stabilization) or in some combination with one another and with the electronic image stabilization.

Based on the analysis, processor 130 may also control the addressing and content of registry addresses, such as e.g., registry 207 of camera unit 116 and registry 227 of S-EIS unit 120. In doing so, processor 130 can control the operation of the S-EIS unit in combination with camera unit 116 and host interface 230. Processor 130, may determine the set the registry addresses to activate or deactivate the stabilization by the S-EIS unit based on the detected motion or other factors of the detected context.

With continued reference to FIG. 9A, at procedure 940 of flow diagram 900, in various embodiments, the determined stabilization correction is applied to the image data by the processor to achieve stabilized image data. The determined stabilization correction is applied and the stabilized image data is achieved by the processor without requiring a transfer of the image data from the memory buffer to a graphics processing unit. For example, the image data is processed into stabilized image data locally, such as inside S-EIS unit 120 without the need for communicating or transferring the image data to a GPU, such as GPU 119, for processing. Reference is made to the techniques of electronic image stabilization previously described in conjunction with FIGS. 2-8.

Processor 130 can be utilized to perform any of these electronic image stabilization corrections as part of a process of reading image data from the first memory buffer (e.g., buffer 142) into a second memory buffer (e.g., buffer 144) in a data order specified by the determined stabilized correction, such that the reading creates the stabilized image data. More particularly in some embodiments, the image data (e.g., 210, 710, 410A, 410B, 410C) is selectively read from the first buffer 142 in a manner specified by the type of image stabilization correction being performed and then written into the second buffer 144 as stabilized image data (e.g., 220, 420A, 420B, 420C, 720, and 820). This selective reading is based on the obtained motion data. It should also be appreciated that after the image data is read from the first memory buffer in the specified manner and before it is written in the second memory buffer as stabilized image data other transformations such as resizing can be performed. It should also be appreciated that act of reading only specified image data, but not all image data, also performs a cropping operation. Additionally, if filtering is to be performed, processor 130 can read image data in a specified manner that allows the image data that has been read from the first memory buffer to have a filtering operation (e.g., as discussed in conjunction with FIG. 8) performed by processor 130 before being written into the second memory buffer as stabilized image data.

With continued reference to FIG. 9A, at procedure 950 of flow diagram 900, in various embodiments, the stabilized image data is output. For example, processor 130 or another processor (e.g., processor 110) may read the stabilized image data out of the second memory buffer (e.g., buffer 144). In some embodiments, the stabilized image data may be output to a display such as display 114 where it is displayed in a manner that a user can view a stabilized image (e.g., stabilized image 630) composed of the stabilized image data. The stabilized image data may be output, in some embodiments, only after a complete image frame of stabilized image data has been buffered in to the second memory buffer.

The stabilized image data may be output in a manner such that it mimics to a characteristic of the image data. Some examples of characteristics, one or more of which may be mimicked, include but are not limited to: data format (i.e., size and aspect ratio of an image formed from said image data), frame rate (the rate at which whole frames or portions thereof of image data are output), delay (which may be an aspect of the frame rate but deals with the space between frames), data size (the total amount of image data in a frame of image data). Mimicking can mean being identical to a characteristic, in some embodiments. In other embodiments, in addition to being identical, mimicking further includes being very close to the value of a characteristic, such as within a few percent of the value of the characteristic.

With respect to frame rate, in some embodiments, the frame rate at which stabilized image data is output is identical to the frame rate at which the corresponding image data was captured. Even though the capture/output frame rates are identical, there may be a delay between image data capture and stabilized image data output that is either inherent, added, or some combination of inherent and added. Some examples of these inherent delays, added delays, and combination inherent/added delays were discussed in conjunction with FIGS. 5A, 5B, and 5C. The type of inherent delay, if any, is related to the type of stabilization correction that is applied to the image data and which portion of the image data to which the correction is applied. For example, as depicted in FIG. 5C no inherent delay is applied when performing rescaling and cropping to the sections of data in a set of image data, but in FIGS. 5A and 5B delays are inherent when applying image stabilization corrections to later received sections of the image data but not to the initially received section(s) of the image data.

With reference to FIG. 9B, at procedure 960 of flow diagram 900, in various embodiments, the method as described in 910-950 further comprises, the processor controlling one or more of a data rate and a full-scale range of the motion sensor(s). For example, the data rate and/or full scale range of one or more motion sensors 150 may be adjusted by processor 130 so that one or both are optimized for electronic image stabilization, optical image stabilization, or for utilization with both electronic image stabilization and optical image stabilization. Processor 130 may control any of the sensors (e.g., 150, 118, 115) internal or external to S-EIS unit 120 and configure them as required for image stabilization.

With reference to FIG. 9C, at procedure 970 of flow diagram 900, in various embodiments, the method as described in 910-950 further comprises, the processor controlling optical image stabilization system of the image sensor based on the motion data. For example, processor 130 may send control signals to an optical image stabilization system 117 to compensate for motion while image data is being captured by an image sensor as opposed to electronic image stabilization which is performed as post-processing after image data has been captured. Comparatively speaking, processor 130 may, for example, utilize electronic image stabilization to compensate for larger and slower motions, and may utilize optical image stabilization to correct for smaller quicker motions.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method of electronic image stabilization comprising:
buffering, into a memory buffer, image data obtained from an image sensor disposed in an electronic device;
obtaining, by a processor, motion data from a motion sensor disposed in said electronic device, said motion sensor for measuring motion of said electronic device, wherein said motion data is indicative of said motion of said electronic device and corresponds with a time of capture of said image data;
analyzing, by said processor, said motion data to determine a stabilization correction to apply to said image data, said analyzing comprising:
analyzing displacement of portions of said image data, wherein said displacement is based on said motion data; and
determining said stabilization correction to correct for said displacement;
applying, by said processor, said determined stabilization correction to said image data from said memory buffer to achieve stabilized image data, wherein said determined stabilization correction is applied and said stabilized image data is achieved by said processor; and
outputting said stabilized image data.

2. The method as recited in claim 1, further comprising:
controlling, by said processor, an optical image stabilization system of said image sensor based on said motion data.

3. The method as recited in claim 1, wherein said applying, by said processor, said determined stabilization correction to said image data to achieve stabilized image data comprises:
reading, by said processor, said image data from said memory buffer into a second memory buffer in a data order specified by said determined stabilization correction, such that said reading creates said stabilized image data.

4. The method as recited in claim 3, wherein said outputting said stabilized image data comprises:
outputting said stabilized image data from said second memory buffer after a complete stabilized image frame has been buffered in said second memory buffer.

5. The method as recited in claim 1, wherein said buffering, by a processor into a memory buffer, image data obtained by said processor from an image sensor disposed in an electronic device comprises:
said processor changing a registry address associated with said image sensor to a second registry address that is associated with said processor.

6. The method as recited in claim 1, wherein said outputting said stabilized image data comprises:
outputting said stabilized image data in a format that mimics a characteristic of said image data.

7. The method as recited in claim 6, wherein said outputting said stabilized image data in a format identical to that of said image data comprises:
outputting said stabilized image data at a frame rate of said obtained image data.

8. The method as recited in claim 6, wherein said outputting said stabilized image data in a format identical to that of said image data comprises:
outputting said stabilized image data at an aspect ratio of said obtained image data.

9. The method as recited in claim 6, wherein said outputting said stabilized image data in a format identical to that of said image data comprises:
outputting said stabilized image data with a delay, wherein an amount of said delay is based on said determined stabilization correction.

10. A stand-alone electronic image stabilizer comprising:
a memory having stored thereon image data obtained from an image sensor disposed in an electronic device; and
a processor coupled with said memory and configured to:
obtain said image data from said memory;
obtain motion data from a motion sensor disposed in said electronic device, said motion sensor for measuring motion of said image sensor, wherein said motion data is indicative of said motion of said image sensor and corresponds with a time of capture of said image data;
analyze said motion data to determine a stabilization correction to apply to said image data, wherein said motion data identifies displacement of portions of said image data and wherein said stabilization correction is based on said motion data to correct for said displacement;
apply said determined stabilization correction to said image data from said memory to achieve stabilized image data, wherein said determined stabilization correction is applied and said stabilized image data is achieved by said processor; and
output said stabilized image data.

11. The stand-alone electronic image stabilizer of claim 10, wherein said image data represents a sub-portion of an image frame.

12. The stand-alone electronic image stabilizer of claim 10, wherein a size of a portion of said memory for storing said image data is adapted to at least one of a size of said image data and stabilization settings utilized by said stabilization correction.

13. The stand-alone electronic image stabilizer of claim 10, wherein said processor obtains said image data by selectively reading from one of said image sensor and a camera buffer, wherein said selective reading is based on said motion data.

14. The stand-alone electronic image stabilizer of claim 10, wherein said stabilization correction comprises at least one of: cropping said image data, transforming said image data, resizing said image data, and filtering said image data.

15. The stand-alone electronic image stabilizer of claim 10, wherein a stabilized image data frame rate is identical to a frame rate of said image data.

16. The stand-alone electronic image stabilizer of claim 15, wherein a delay is applied to said output of said stabilized image data, wherein said delay is linked to said stabilization correction applied to said image data to achieve said stabilized image data.

17. The stand-alone electronic image stabilizer of claim 10, wherein said processor, said memory, and said motion sensor are disposed in a single integrated circuit with one another.

18. The stand-alone electronic image stabilizer of claim 10, where said processor is further configured to access a registry associated with said image sensor.

19. The stand-alone electronic image stabilizer of claim 10, where said processor is further configured to change a registry address associated with said image sensor to a second registry address associated with said stand-alone electronic image stabilizer.

20. A mobile electronic device, said mobile electronic device comprising:
 a host processor;
 at least one of a gyroscope or accelerometer;
 an image sensor coupled with said host processor;
 a memory coupled with said host processor and having stored thereon image data obtained from said image sensor; and
 a stand-alone electronic image stabilizer coupled with said image sensor, said host processor, and at least one of said gyroscope or said accelerometer, said stand-alone electronic image stabilizer comprising:
  a processor coupled with said memory and configured to:
   obtain said image data from said memory;
   obtain motion data from said gyroscope or accelerometer, wherein said motion data is indicative of motion of said image sensor and corresponds with a time of capture of said image data;
   analyze said motion data to determine a stabilization correction to apply to said image data, wherein said motion data identifies displacement of portions of said image data and wherein said stabilization correction is based on said motion data to correct for said displacement;
   apply said determined stabilization correction to said image data from said memory to achieve stabilized image data, wherein said determined stabilization correction is applied and said stabilized image data is achieved by said processor; and
  output said stabilized image data.

* * * * *